(12) United States Patent
Tavakoli et al.

(10) Patent No.: US 11,238,664 B1
(45) Date of Patent: Feb. 1, 2022

(54) RECOMMENDATIONS FOR EXTENDED REALITY SYSTEMS

(71) Applicant: QUALCOMM Incorporated, San Diego, CA (US)

(72) Inventors: Mehrad Tavakoli, Cupertino, CA (US); Robert Tartz, San Marcos, CA (US); Scott Beith, Carlsbad, CA (US); Gerhard Reitmayr, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/090,841

(22) Filed: Nov. 5, 2020

(51) Int. Cl.
 *G06T 19/00* (2011.01)
 *G02B 27/00* (2006.01)
 *G02B 27/01* (2006.01)

(52) U.S. Cl.
 CPC ........ *G06T 19/006* (2013.01); *G02B 27/0093* (2013.01); *G02B 27/017* (2013.01)

(58) Field of Classification Search
 None
 See application file for complete search history.

(56) References Cited

U.S. PATENT DOCUMENTS

| | | | |
|---|---|---|---|
| 9,132,342 B2 | 9/2015 | Balachandreswaran et al. | |
| 10,031,738 B2* | 7/2018 | Patil | G06F 8/61 |
| 10,049,500 B2 | 8/2018 | Morrison | |
| 10,262,265 B2* | 4/2019 | Lu | G06F 8/61 |
| 10,332,184 B2* | 6/2019 | Glover | G06Q 30/0631 |
| 2015/0106801 A1* | 4/2015 | Agrawal | G06F 8/60 717/177 |
| 2016/0234595 A1* | 8/2016 | Goran | H04R 3/002 |
| 2017/0178013 A1 | 6/2017 | Beloglazov et al. | |
| 2018/0159838 A1 | 6/2018 | Dintenfass | |
| 2019/0339840 A1* | 11/2019 | Park | G02B 27/017 |
| 2019/0340649 A1 | 11/2019 | Ayush et al. | |
| 2019/0350066 A1* | 11/2019 | Herf | H05B 47/11 |
| 2021/0064194 A1* | 3/2021 | Lee | G06F 3/04845 |

* cited by examiner

*Primary Examiner* — Jwalant Amin
(74) *Attorney, Agent, or Firm* — Qualcomm Incorporated

(57) ABSTRACT

Techniques and systems are provided for providing recommendations for extended reality systems. In some examples, a system determines one or more environmental features associated with a real-world environment of an extended reality system. The system determines one or more user features associated with a user of the extended reality system. The system also outputs, based on the one or more environmental features and the one or more user features, a notification associated with at least one application supported by the extended reality system.

41 Claims, 7 Drawing Sheets

600

```
┌─────────────────────────────────────────────────────────────────────┐
│ Determine One Or More Environmental Features Associated With A Real-world │
│          Environment Of An Extended Reality System                  │
│                              602                                    │
└─────────────────────────────────────────────────────────────────────┘
                                  │
                                  ▼
┌─────────────────────────────────────────────────────────────────────┐
│    Determine One Or More User Features Associated With A User Of The │
│                    Extended Reality System                          │
│                              604                                    │
└─────────────────────────────────────────────────────────────────────┘
                                  │
                                  ▼
┌─────────────────────────────────────────────────────────────────────┐
│ Output, Based On The One Or More Environmental Features And The One Or │
│ More User Features, A Notification Associated With At Least One Application │
│           Supported By The Extended Reality System                  │
│                              606                                    │
└─────────────────────────────────────────────────────────────────────┘
```

FIG. 6

RECOMMENDATIONS FOR EXTENDED REALITY SYSTEMS

FIELD

The present disclosure generally relates to providing adaptive recommendations for extended reality systems. In some examples, aspects of the present disclosure are related to providing recommendations associated with extended reality applications based on characteristics of a real-world environment in which an extended reality system is located and/or based on characteristics of a user of the extended reality system.

BACKGROUND

Extended reality technologies can be used to present virtual content to users, and/or can combine real environments from the physical world and virtual environments to provide users with extended reality experiences. The term extended reality can encompass virtual reality, augmented reality, mixed reality, and the like. Extended reality systems can allow users to experience extended reality environments by overlaying virtual content onto images of a real-world environment, which can be viewed by a user through an extended reality device (e.g., a head-mounted display, extended reality glasses, or other device).

Many features of a user's real-world environment can impact their experience with an extended reality application. As a result, the user may be unaware of which extended reality applications are compatible with their current environment. In addition, the user may be unsure of how to best configure the environment for an optimal extended reality experience. Accordingly, improved systems for adapting recommendations associated with extended reality applications based on real-world environments are needed.

SUMMARY

Systems and techniques are described herein for providing recommendations for extended reality systems. According to at least one example, apparatuses are provided for providing recommendations for extended reality systems. An example apparatus can include memory and one or more processors (e.g., configured in circuitry). The one or more processors are configured to: determine one or more environmental features associated with a real-world environment of the apparatus; determine one or more user features associated with a user of the apparatus; and output, based on the one or more environmental features and the one or more user features, a notification associated with at least one application supported by the apparatus. In one example, the apparatus can be an extended reality system.

In another example, methods are provided for providing recommendations for extended reality systems. An example method can include determining one or more environmental features associated with a real-world environment of an extended reality system. The method can also include determining one or more user features associated with a user of the extended reality system. The method can further include outputting, based on the one or more environmental features and the one or more user features, a notification associated with at least one application supported by the extended reality system.

In another example, non-transitory computer-readable media are provided for adjusting virtual content within extended reality systems. An example non-transitory computer-readable medium can store instructions that, when executed by one or more processors, cause the one or more processors to: determine one or more environmental features associated with a real-world environment of an extended reality system; determine one or more user features associated with a user of the extended reality system; and output, based on the one or more environmental features and the one or more user features, a notification associated with at least one application supported by the extended reality system.

In another example, an example apparatus can include: means for determining one or more environmental features associated with a real-world environment of an extended reality system; means for determining one or more user features associated with a user of the extended reality system; means for outputting, based on the one or more environmental features and the one or more user features, a notification associated with at least one application supported by the extended reality system.

In some aspects, the notification associated with the at least one application includes a recommendation of the at least one application, the recommendation of the at least one application being determined based on the one or more environmental features and the one or more user features. In some aspects, the notification associated with the at least one application includes a recommendation of at least one modification associated with the at least one application. Some aspects can further include detecting the user is interacting with the at least one application and determining the at least one modification associated with the at least one application based on detecting the user is interacting with the at least one application. In one example, the at least one modification can be associated with the real-world environment. In another example, the at least one modification can be associated with one or more settings of the at least one application. Some aspects can further include determining the at least one modification based on at least one of environmental features associated with a plurality of users and user features associated with the plurality of users.

In some aspects, the one or more environmental features can be determined based at least in part on previously stored data indicating the one or more environmental features. Additionally or alternatively, the one or more environmental features can be determined based at least in part on a scan of the real-world environment. Some aspects can include causing the scan of the real-world environment, the scan of the real-world environment being performed by an image sensor of the extended reality system.

In some aspects, the one or more environmental features can be determined based at least in part on image data associated with the real-world environment captured by at least one image sensor of the extended reality system. In one example, determining the one or more environmental features can include determining a layout of one or more physical objects within the real-world environment based at least in part on the image data. In another example, the one or more environmental features can include determining activity of one or more people within the real-world environment based at least in part on the image data.

In some aspects, the one or more environmental features can be determined based at least in part on audio data associated with the real-world environment captured by an audio sensor of the extended reality system. In one example, determining the one or more environmental features can include determining activity of one or more people within the real-world environment based at least in part on the audio data. In other examples, determining the one or more environmental features can include detecting one or more network-enabled devices within the real-world environment based on network communication with the one or more network-enabled devices.

In some aspects, the one or more user features can be determined based at least in part on user data obtained using one or more biological sensors of the extended reality system, where the user data is associated with a physiological state or an emotional state of the user. In some examples, the one or more user features can be determined based at least in part on user input indicating at least one of an age of the user, a gender of the user, a geographic location of the user, a height of the user, and a weight of the user. In other examples, the one or more user features can be determined based at least in part on monitoring application usage patterns of the user to determine application preferences of the user.

In some aspects, determining the at least one application supported by the extended reality system can include: determining a match score indicating a level of compatibility between the at least one application and at least one of the one or more environmental features and the one or more user features; determining the match score exceeds a threshold match score; and determining the at least one application based on the match score exceeding the threshold match score. In some examples, the match score can be determined based at least in part on: determining one or more application features associated with the at least one application; and comparing the one or more application features with at least one of the one or more environmental features and the one or more user features. In one example, the one or more application features can be determined based at least in part on accessing an application profile associated with the at least one application from a server, wherein the application profile is generated based on application features determined by a plurality of extended reality systems.

In some aspects, a plurality of applications supported by the extended reality system can be determined using the one or more environmental features and the one or more user features. In some cases, a recommendation of the plurality of applications can be provided to the user. In one example, a plurality of match scores indicating levels of compatibility between the plurality of applications and at least the one or more environmental features can be determined. In another example, a plurality of match scores indicating levels of compatibility between the plurality of applications and at least the one or more user features can be determined. In some cases, a plurality of match scores can be displayed in association with the plurality of applications on a display of the extended reality system. In one example, the display of the extended reality system can display an indication of an application of the plurality of applications having a highest match score of the plurality of match scores.

According to at least one other example, an example method operable on a user device is provided. The method comprises: receiving signals from one or more detectors arranged to detect one or more environmental features associated with a real world environment in which the user device of an extended reality system is located; retrieving data from a user data store relating to one or more user features associated with interactions between the user and applications supported by the extended reality system; determining, using the signals from the one or more detectors and the data from the user store, at least one application supported by the extended reality system suitable for use by the user device in the real world environment; and facilitating launch of the at least one application on the user device.

In another example, an example apparatus can include memory and one or more processors (e.g., configured in circuitry). The one or more processors are configured to: receive signals from one or more detectors arranged to detect one or more environmental features associated with a real world environment in which the user device of an extended reality system is located; retrieve data from a user data store relating to one or more user features associated with interactions between the user and applications supported by the extended reality system; determine, using the signals from the one or more detectors and the data from the user store, at least one application supported by the extended reality system suitable for use by the user device in the real world environment; and facilitate launch of the at least one application on the user device.

In another example, an example non-transitory computer-readable medium can store instructions that, when executed by one or more processors, cause the one or more processors to: receive signals from one or more detectors arranged to detect one or more environmental features associated with a real world environment in which the user device of an extended reality system is located; retrieve data from a user data store relating to one or more user features associated with interactions between the user and applications supported by the extended reality system; determine, using the signals from the one or more detectors and the data from the user store, at least one application supported by the extended reality system suitable for use by the user device in the real world environment; and facilitate launch of the at least one application on the user device.

In another example, an example apparatus can include: means for receiving signals from one or more detectors arranged to detect one or more environmental features associated with a real world environment in which the user device of an extended reality system is located; means for retrieving data from a user data store relating to one or more user features associated with interactions between the user and applications supported by the extended reality system; means for determining, using the signals from the one or more detectors and the data from the user store, at least one application supported by the extended reality system suitable for use by the user device in the real world environment; and means for facilitating launch of the at least one application on the user device.

In some aspects, facilitating launch of an application comprises automatically launching an application on the use device.

In some aspects, facilitating launch of an application comprises controlling the display to give an indication of an application to a user of the device.

In some aspects, the apparatus comprises a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures:

FIG. 6 is a flow diagram illustrating another example of a process for providing adaptive recommendations associated with extended reality environments, in accordance with some examples.

DETAILED DESCRIPTION

Figure 1:
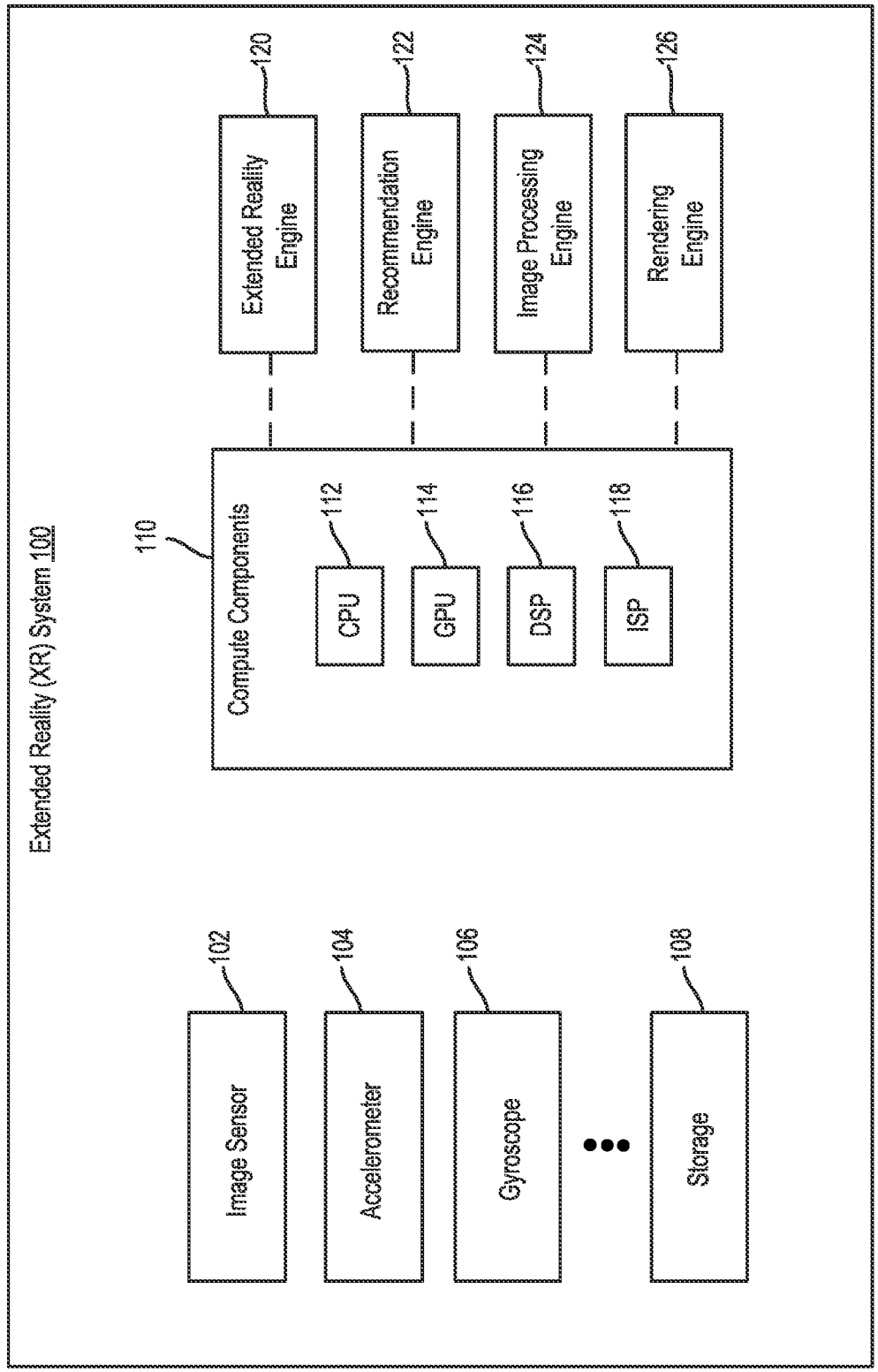
FIG. 1 is a block diagram illustrating an example architecture of an extended reality system, in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

Extended reality (XR) devices or systems can facilitate interactions with different types of XR environments, including virtual reality (VR) environments, augmented reality (AR) environments, mixed reality (MR) environments, and/or other XR environments. An XR device or system can be used by a user to interact with an XR environment. Examples of XR devices or systems include head-mounted displays (HMDs), XR glasses, among others. An XR device or system can cause virtual content to be overlaid onto images of a real-world environment, which can be viewed by a user through the XR device or system. Some XR devices or systems may provide accompanying audio content. The real-world environment can include physical objects, people, or other real-world objects. An XR device or system can track parts of the user (e.g., a hand and/or fingertips of the user) to allow the user to interact with items of virtual content Various features of the real-world environment in which an XR system is located can impact a user's experience with an XR-based application. For instance, an XR-based gaming application designed for multiple players may require a large open space for optimal game play. However, other XR-based gaming applications (such as single player games or games utilizing furniture and other physical objects) may be better suited for smaller and/or cluttered environments. In another example, some XR-based applications (e.g., navigation applications designed for use on a public street) may be compatible with high levels of ambient noise, whereas other XR-based applications (e.g., teleconferencing applications) may be best experienced in quiet environments.

In some cases, users may be unaware of which XR-based applications are most suited for their current real-world environment. For instance, a user who wishes to experience new applications may be unaware of which new applications are compatible with their environment, and a user in an unfamiliar environment may be unsure of how to best configure the unfamiliar environment to optimize a known application. Further, users may be unaware of possible modifications that can be made to the environment and/or to an application to enhance or facilitate using the application. Accordingly, improved systems for adapting recommendations for XR-based applications based on real-world environments are needed.

The present disclosure describes systems, apparatuses, methods, and computer-readable media (collectively referred to as "systems and techniques") for providing environment-based recommendations for XR applications. The systems and techniques provide the ability for an XR system to adapt recommendations associated with XR applications based on the current real-world environment in which the XR system is located. In some cases, the recommendations can include suggestions for one or more applications most suited for the user's environment. Additionally or alternatively, the recommendations can include suggested modifications to the user's environment and/or a particular application that will enhance or facilitate user interactions with the application. The XR system can determine appropriate recommendations based on monitoring and/or analyzing the user's real-world environment. In some cases, the XR system can also generate a recommendation based on the characteristics of the user, such as the user's historical application use and/or current emotional or physiological state.

The XR system can monitor and/or analyze various features of the user's real-world environment. In some examples, the XR system can determine ambient environmental characteristics, such as ambient noise, lighting, temperature, smells, a location of the XR system or location relative to the XR system, a current date, a current time, and/or other characteristics. In further examples, the XR system can determine a physical layout of the environment. The physical layout can include the types of rooms in the user's home, divisions between rooms in the user's home, and/or furniture and other physical objects within the rooms. The XR system can determine the physical layout using a blueprint of the environment and/or by actively scanning the environment. In some cases, the XR system can implement one or more techniques for scene understanding, which can include determining and/or inferring background activity within the environment. In an illustrative example of scene understanding, the XR system can determine that someone is currently cooking in the user's home, or determine that a baby is sleeping in another room. In some cases, the XR system can generate an environmental profile that describes and/or represents relevant features of the user's environment. The XR system can store previously determined environmental features within a profile associated with a particular location, as well as update one or more environmental features each time the user interacts with the XR system at the particular location.

The XR system can determine various characteristics associated with the user. In some cases, the XR system can determine application preferences of the user. For instance, the XR system can track the amount of time the user spends interacting with different applications, the types of applications the user generally selects, the user's skill level associated with different types of applications, the types of environments in which the user generally selects certain applications, any combination thereof, and/or other information. Additionally or alternatively, the XR system can determine the type and/or number of XR devices (e.g., input devices, controllers, HMDs, etc.) used by the user. Further, the XR system can determine which devices the user prefers (e.g., has historically used) for various applications. In some examples, the XR system can determine demographic information about the user, such as the user's age, gender, location, size (e.g., height and/or weight), any combination thereof, and/or other information. In some examples, the XR system can determine this demographic information using one or more biometric sensors, computer vision systems, and/or other techniques. Additionally or alternatively, the XR system can determine demographic information based on input provided from the user. In some cases, the XR system can determine restrictions that may prevent the user from interacting with certain applications. In an illustrative example, the XR system can determine that the user has limited mobility, or determine that the user's application use is limited by parental controls. In some examples, the XR system can determine that the user has particular athletic abilities that enable the user to enjoy or properly interact with applications that involve running, jumping, crouching, and/or other physical actions. Further, in some examples, the XR system can determine (e.g., using biometric sensors, computer vision, and/or other techniques) a current physiological and/or emotional state of the user. For instance, the XR system can detect if the user is tired, excited, relaxed, upset, etc. In some examples, the XR system can record historical data indicating the user's physiological and/or emotional states when previously using certain applications. In some cases, the XR system can generate a user profile that describes and/or represents characteristics of the user relevant to XR-based applications.

In order to identify applications to recommend to the user, the XR system can determine and compile information about applications the user is known to use and/or that the XR system is capable of running. For instance, the XR system can determine environmental requirements for an application, such as particular temperatures, lighting, ambient noise, room sizes, room layouts, etc. that enhance or facilitate certain applications. In some examples, the XR system can determine types of environments and/or environmental characteristics that one or more users have historically preferred for certain applications. In addition, the XR system can determine characteristics of users that have historically enjoyed and/or used certain applications. For example, the XR system can record ratings of applications provided by multiple users. In another example, the XR system can determine equipment (such as particular XR input devices, types of network connections, etc.) required for an application. In some cases, the XR system can generate application profiles that describe and/or represent such characteristics of applications.

The XR system can utilize the environmental profile, the user profile, and/or one or more application profiles to generate application recommendations for the user. For instance, the XR system can recommend applications with application profiles containing characteristics that match one or more characteristics of the user profile and/or the environmental profile. In this way, the XR system can recommend applications that are suitable for the user's personal application preferences, the user's personal characteristics, and/or the user's current environment. In some cases, the XR system can determine whether to recommend an application to the user by generating a match score that quantifies a level of similarity and/or compatibility between the application profile of the application and the user profile and/or environmental profile. The XR system can assign various weights to the characteristics within the profiles when generating the match score.

In some cases, the XR system can provide a list of recommended applications to the user. The XR system can recommend each application determined to have a match score above or exceeding a threshold score, and/or the XR system can provide a predetermined number of highest-matching applications. Further, the XR system can recommend applications the user already owns or has downloaded and/or recommend new applications. In an illustrative example, the XR system can determine that the user is currently in a relatively small room and, therefore, recommend applications that do not require significant movement. In another illustrative example, the XR system can recommend applications that do not involve speech or audio content (e.g., conversations with other users) based on detecting that the user is currently in a relatively noisy environment.

Further, in some cases, the XR system can recommend one or more modifications to the user's environment that enhance or facilitate user interactions with an application. For example, in response to detecting that the user has selected to use the application, the XR system can determine that one or more environmental features (such as the lighting, the placement of furniture, the user's current room within a house, etc.) should be altered in order for the user to properly or most effectively utilize the application. In an illustrative example, the XR system can recommend that a user move a piece of furniture to a different room based on determining that the user has selected to use an application that requires a large open space. Moreover, the XR system can recommend one or more modifications to the settings of a selected application. For example, the XR system can recommend increasing the display brightness of an XR device based on detecting a high level of ambient light.

Further details regarding context-aware XR systems are provided herein with respect to various figures. FIG. 1 is a block diagram illustrating an example extended reality system 100, in accordance with some aspects of the disclosure. The extended reality system 100 can run (or execute) XR applications and implement XR operations. In some examples, the extended reality system 100 can perform tracking and localization, mapping of the physical world (e.g., a scene), and positioning and rendering of virtual content on a display (e.g., a screen, visible plane/region, and/or other display) as part of an XR experience. For example, the extended reality system 100 can generate a map (e.g., 3D map) of a scene in the physical world, track a pose (e.g., location and position) of the extended reality system 100 relative to the scene (e.g., relative to the 3D map of the scene), position and/or anchor virtual content in a specific location(s) on the map of the scene, and render the virtual content on the display. The extended reality system 100 can render the virtual content on the display such that the virtual content appears to be at a location in the scene corresponding to the specific location on the map of the scene where the virtual content is positioned and/or anchored. In some examples, the display can include a glass, a screen, a lens, and/or other display mechanism that allows a user to see the real-world environment and also allows XR content to be displayed thereon.

As shown in FIG. 1, the extended reality system 100 can include one or more image sensors 102, an accelerometer 104, a gyroscope 106, storage 108, compute components 110, an XR engine 120, a recommendation engine 122, an image processing engine 124, and a rendering engine 126. It should be noted that the components 102-126 shown in FIG. 1 are non-limiting examples provided for illustrative and explanation purposes, and other examples can include more, less, or different components than those shown in FIG. 1. For example, in some cases, the extended reality system 100 can include one or more other sensors (e.g., one or more inertial measurement units (IMUs), radars, light detection and ranging (LIDAR) sensors, audio sensors, etc.), one or more display devices, one more other processing engines, one or more other hardware components, and/or one or more other software and/or hardware components that are not shown in FIG. 1. An example architecture and example hardware components that can be implemented by the extended reality system 100 are further described below with respect to FIG. 7.

For simplicity and explanation purposes, the one or more image sensors 102 will be referenced herein as an image sensor 102 (e.g., in singular form). However, one of ordinary skill in the art will recognize that the extended reality system 100 can include a single image sensor or multiple image sensors. Also, references to any of the components (e.g., 102-126) of the extended reality system 100 in the singular or plural form should not be interpreted as limiting the number of such components implemented by the extended reality system 100 to one or more than one. For example, references to an accelerometer 104 in the singular form should not be interpreted as limiting the number of accelerometers implemented by the extended reality system 100 to one. One of ordinary skill in the art will recognize that, for any of the components 102-126 shown in FIG. 1, the extended reality system 100 can include only one of such component(s) or more than one of such component(s).

The extended reality system 100 can include or be in communication with (wired or wirelessly) an input device. The input device can include any suitable input device, such as a touchscreen, a pen or other pointer device, a keyboard, a mouse, a button or key, a microphone for receiving voice commands, a gesture input device for receiving gesture commands, any combination thereof, and/or other input device. In some cases, the image sensor 102 can capture images that can be processed for interpreting gesture commands.

The extended reality system 100 can be part of, or implemented by, a single computing device or multiple computing devices. In some examples, the extended reality system 100 can be part of an electronic device (or devices) such as an extended reality head-mounted display (HMD) device, extended reality glasses (e.g., augmented reality or AR glasses), a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a smart television, a display device, a gaming console, a video streaming device, an Internet-of-Things (IoT) device, and/or any other suitable electronic device(s).

In some implementations, the one or more image sensors 102, the accelerometer 104, the gyroscope 106, storage 108, compute components 110, the XR engine 120, the recommendation engine 122, the image processing engine 124, and the rendering engine 126 can be part of the same computing device. For example, in some cases, the one or more image sensors 102, the accelerometer 104, the gyroscope 106, storage 108, compute components 110, the XR engine 120, the recommendation engine 122, image processing engine 124, and rendering engine 126 can be integrated into an HMD, extended reality glasses, smartphone, laptop, tablet computer, gaming system, and/or any other computing device. However, in some implementations, the one or more image sensors 102, the accelerometer 104, the gyroscope 106, storage 108, compute components 110, the XR engine 120, the recommendation engine 122, the image processing engine 124, and the rendering engine 126 can be part of two or more separate computing devices. For example, in some cases, some of the components 102-126 can be part of, or implemented by, one computing device and the remaining components can be part of, or implemented by, one or more other computing devices.

The storage 108 can be any storage device(s) for storing data. Moreover, the storage 108 can store data from any of the components of the extended reality system 100. For example, the storage 108 can store data from the image sensor 102 (e.g., image or video data), data from the accelerometer 104 (e.g., measurements), data from the gyroscope 106 (e.g., measurements), data from the compute components 110 (e.g., processing parameters, preferences, virtual content, rendering content, scene maps, tracking and localization data, object detection data, privacy data, XR application data, face recognition data, occlusion data, etc.), data from the XR engine 120, data from the recommendation engine 122, data from the image processing engine 124, and/or data from the rendering engine 126 (e.g., output frames). In some examples, the storage 108 can include a buffer for storing frames for processing by the compute components 110.

The one or more compute components 110 can include a central processing unit (CPU) 112, a graphics processing unit (GPU) 114, a digital signal processor (DSP) 116, and/or an image signal processor (ISP) 118. The compute components 110 can perform various operations such as image enhancement, computer vision, graphics rendering, extended reality (e.g., tracking, localization, pose estimation, mapping, content anchoring, content rendering, etc.), image/video processing, sensor processing, recognition (e.g., text recognition, facial recognition, object recognition, feature recognition, tracking or pattern recognition, scene recognition, occlusion detection, etc.), machine learning, filtering, and any of the various operations described herein. In this example, the compute components 110 implement the XR engine 120, the recommendation engine 122, the image processing engine 124, and the rendering engine 126. In other examples, the compute components 110 can also implement one or more other processing engines.

The image sensor 102 can include any image and/or video sensors or capturing devices. In some examples, the image sensor 102 can be part of a multiple-camera assembly, such as a dual-camera assembly. The image sensor 102 can capture image and/or video content (e.g., raw image and/or video data), which can then be processed by the compute components 110, the XR engine 120, the recommendation engine 122, the image processing engine 124, and/or the rendering engine 126 as described herein.

In some examples, the image sensor 102 can capture image data and can generate frames based on the image data and/or can provide the image data or frames to the XR engine 120, the recommendation engine 122, the image processing engine 124, and/or the rendering engine 126 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some cases, the image sensor 102 (and/or other image sensor or camera of the extended reality system 100) can be configured to also capture depth information. For example, in some implementations, the image sensor 102 (and/or other camera) can include an RGB-depth (RGB-D) camera. In some cases, the extended reality system 100 can include one or more depth sensors (not shown) that are separate from the image sensor 102 (and/or other camera) and that can capture depth information. For instance, such a depth sensor can obtain depth information independently from the image sensor 102. In some examples, a depth sensor can be physically installed in a same general location as the image sensor 102, but may operate at a different frequency or frame rate from the image sensor 102. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

As noted above, in some cases, the extended reality system 100 can also include one or more sensors (not shown) other than the image sensor 102. For instance, the one or more sensors can include one or more accelerometers (e.g., accelerometer 104), one or more gyroscopes (e.g., gyroscope 106), and/or other sensors. The one or more sensors can provide velocity, orientation, and/or other position-related information to the compute components 110. For example, the accelerometer 104 can detect acceleration by the extended reality system 100 and can generate acceleration measurements based on the detected acceleration. In some cases, the accelerometer 104 can provide one or more translational vectors (e.g., up/down, left/right, forward/back) that can be used for determining a position or pose of the extended reality system 100. The gyroscope 106 can detect and measure the orientation and angular velocity of the extended reality system 100. For example, the gyroscope 106 can be used to measure the pitch, roll, and yaw of the extended reality system 100. In some cases, the gyroscope 106 can provide one or more rotational vectors (e.g., pitch, yaw, roll). In some examples, the image sensor 102 and/or the XR engine 120 can use measurements obtained by the accelerometer 104 (e.g., one or more translational vectors) and/or the gyroscope 106 (e.g., one or more rotational vectors) to calculate the pose of the extended reality system 100. As previously noted, in other examples, the extended reality system 100 can also include other sensors, such as an inertial measurement unit (IMU), a magnetometer, a machine vision sensor, a smart scene sensor, a speech recognition sensor, an impact sensor, a shock sensor, a position sensor, a tilt sensor, etc.

In some cases, the one or more sensors can include at least one IMU. An IMU is an electronic device that measures the specific force, angular rate, and/or the orientation of the extended reality system 100, using a combination of one or more accelerometers, one or more gyroscopes, and/or one or more magnetometers. In some examples, the one or more sensors can output measured information associated with the capture of an image captured by the image sensor 102 (and/or other camera of the extended reality system 100) and/or depth information obtained using one or more depth sensors of the extended reality system 100.

The output of one or more sensors (e.g., the accelerometer 104, the gyroscope 106, one or more IMUs, and/or other sensors) can be used by the extended reality engine 120 to determine a pose of the extended reality system 100 (also referred to as the head pose) and/or the pose of the image sensor 102 (or other camera of the extended reality system 100). In some cases, the pose of the extended reality system 100 and the pose of the image sensor 102 (or other camera) can be the same. The pose of the image sensor 102 refers to the position and orientation of the image sensor 102 relative to a frame of reference. In some implementations, the pose of the image sensor 102 (or other camera) can be determined for 6-Degrees Of Freedom (6DOF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference).

In some cases, a device tracker (not shown) can use the measurements from the one or more sensors and image data from the image sensor 102 to track a pose (e.g., a 6DOF pose) of the extended reality system 100. For example, the device tracker can fuse visual data (e.g., using a visual tracking solution) from captured image data with inertial measurement data to determine a position and motion of the extended reality system 100 relative to the physical world (e.g., the scene) and a map of the physical world. As described below, in some examples, when tracking the pose of the extended reality system 100, the device tracker can generate a three-dimensional (3D) map of the scene (e.g., the real-world) and/or generate updates for a 3D map of the scene. The 3D map updates can include, for example and without limitation, new or updated features and/or feature or landmark points associated with the scene and/or the 3D map of the scene, localization updates identifying or updating a position of the extended reality system 100 within the scene and/or the 3D map of the scene, etc. The 3D map can provide a digital representation of a scene in the real/physical world. In some examples, the 3D map can anchor location-based objects and/or content to real-world coordinates and/or objects. The extended reality system 100 can use a mapped scene (e.g., a scene in the physical world represented by, and/or associated with, a 3D map) to merge the physical and virtual worlds and/or merge virtual content or objects with the physical environment.

In some aspects, the pose of image sensor 102 and/or the extended reality system 100 as a whole can be determined and/or tracked by the compute components 110 using a visual tracking solution based on images captured by the image sensor 102 (and/or other camera of the extended reality system 100). For instance, in some examples, the compute components 110 can perform tracking using computer vision-based tracking, model-based tracking, and/or simultaneous localization and mapping (SLAM) techniques. For instance, the compute components 110 can perform SLAM or can be in communication (wired or wireless) with a SLAM engine (not shown). SLAM refers to a class of techniques where a map of an environment (e.g., a map of an environment being modeled by extended reality system 100) is created while simultaneously tracking the pose of a camera (e.g., image sensor 102) and/or the extended reality system 100 relative to that map. The map can be referred to as a SLAM map, and can be 3D. The SLAM techniques can be performed using color or grayscale image data captured by the image sensor 102 (and/or other camera of the extended reality system 100), and can be used to generate estimates of 6DOF pose measurements of the image sensor 102 and/or the extended reality system 100. Such a SLAM technique configured to perform 6DOF tracking can be referred to as 6DOF SLAM. In some cases, the output of the one or more sensors (e.g., the accelerometer 104, the gyroscope 106, one or more IMUs, and/or other sensors) can be used to estimate, correct, and/or otherwise adjust the estimated pose.

In some cases, the 6DOF SLAM (e.g., 6DOF tracking) can associate features observed from certain input images from the image sensor 102 (and/or other camera) to the SLAM map. For example, 6DOF SLAM can use feature point associations from an input image to determine the pose (position and orientation) of the image sensor 102 and/or extended reality system 100 for the input image. 6DOF mapping can also be performed to update the SLAM map. In some cases, the SLAM map maintained using the 6DOF SLAM can contain 3D feature points triangulated from two or more images. For example, key frames can be selected from input images or a video stream to represent an observed scene. For every key frame, a respective 6DOF camera pose associated with the image can be determined. The pose of the image sensor 102 and/or the extended reality system 100 can be determined by projecting features from the 3D SLAM map into an image or video frame and updating the camera pose from verified 2D-3D correspondences.

In one illustrative example, the compute components 110 can extract feature points from every input image or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The features points in key frames either match (are the same or correspond to) or fail to match the features points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Speed Up Robust Features (SURF), Gradient Location-Orientation histogram (GLOH), Normalized Cross Correlation (NCC), or other suitable technique.

In some cases, the extended reality system 100 can also track the hand and/or fingers of a user to allow the user to interact with and/or control virtual content in a virtual environment. For example, the extended reality system 100 can track a pose and/or movement of the hand and/or fingertips of the user to identify or translate user interactions with the virtual environment. The user interactions can include, for example and without limitation, moving an item of virtual content, resizing the item of virtual content and/or a location of the virtual private space, selecting an input interface element in a virtual user interface (e.g., a virtual representation of a mobile phone, a virtual keyboard, and/or other virtual interface), providing an input through a virtual user interface, etc.

The operations for the XR engine 120, the recommendation engine 122, the image processing engine 124, and the rendering engine 126 (and any image processing engines) can be implemented by any of the compute components 110. In one illustrative example, the operations of the rendering engine 126 can be implemented by the GPU 114, and the operations of the XR engine 120, the recommendation engine 122, and the image processing engine 124 can be implemented by the CPU 112, the DSP 116, and/or the ISP 118. In some cases, the compute components 110 can include other electronic circuits or hardware, computer software, firmware, or any combination thereof, to perform any of the various operations described herein.

In some examples, the XR engine 120 can perform XR operations to generate an XR experience based on data from the image sensor 102, the accelerometer 104, the gyroscope 106, and/or one or more sensors on the extended reality system 100, such as one or more IMUs, radars, etc. In some examples, the XR engine 120 can perform tracking, localization, pose estimation, mapping, content anchoring operations and/or any other XR operations/functionalities. An XR experience can include use of the extended reality system 100 to present XR content (e.g., virtual reality content, augmented reality content, mixed reality content, etc.) to a user during a virtual session. In some examples, the XR content and experience can be provided by the extended reality system 100 through an XR application (e.g., executed or implemented by the XR engine 120) that provides a specific XR experience such as, for example, an XR gaming experience, an XR classroom experience, an XR shopping experience, an XR entertainment experience, an XR activity (e.g., an operation, a troubleshooting activity, etc.), among others. During the XR experience, the user can view and/or interact with virtual content using the extended reality system 100. In some cases, the user can view and/or interact with the virtual content while also being able to view and/or interact with the physical environment around the user, allowing the user to have an immersive experience between the physical environment and virtual content mixed or integrated with the physical environment.

The recommendation engine 122 can perform various operations to provide adaptive recommendations in association with the extended reality system 100. An adaptive recommendation associated with an extended reality system, as used herein, can include any recommendation configured to improve and/or optimize interactions between a user and an XR-based application and/or interactions between a user and a real-world environment while the user engages with an XR-based application. In some cases, an adaptive recommendation can include a recommendation of one or more XR-based applications that the recommendation engine 122 determines are suitable for use by the user within the current real-world environment. For instance, the recommendation engine 122 can provide an indication of one or more XR-based applications that are determined to be compatible with contextual factors such as the user's application preferences, the user's current emotional and/or physiological state, and/or features of the real-world environment. In some examples, an adaptive recommendation can include a recommendation to modify one or more aspects of an XR-based application and/or the real-world environment. For instance, after the user selects an application to be launched by the extended reality system 100, the recommendation engine 122 can determine one or more adjustments to settings of the application and/or features of the environment that are configured to improve the user's XR experience.

Figure 2:
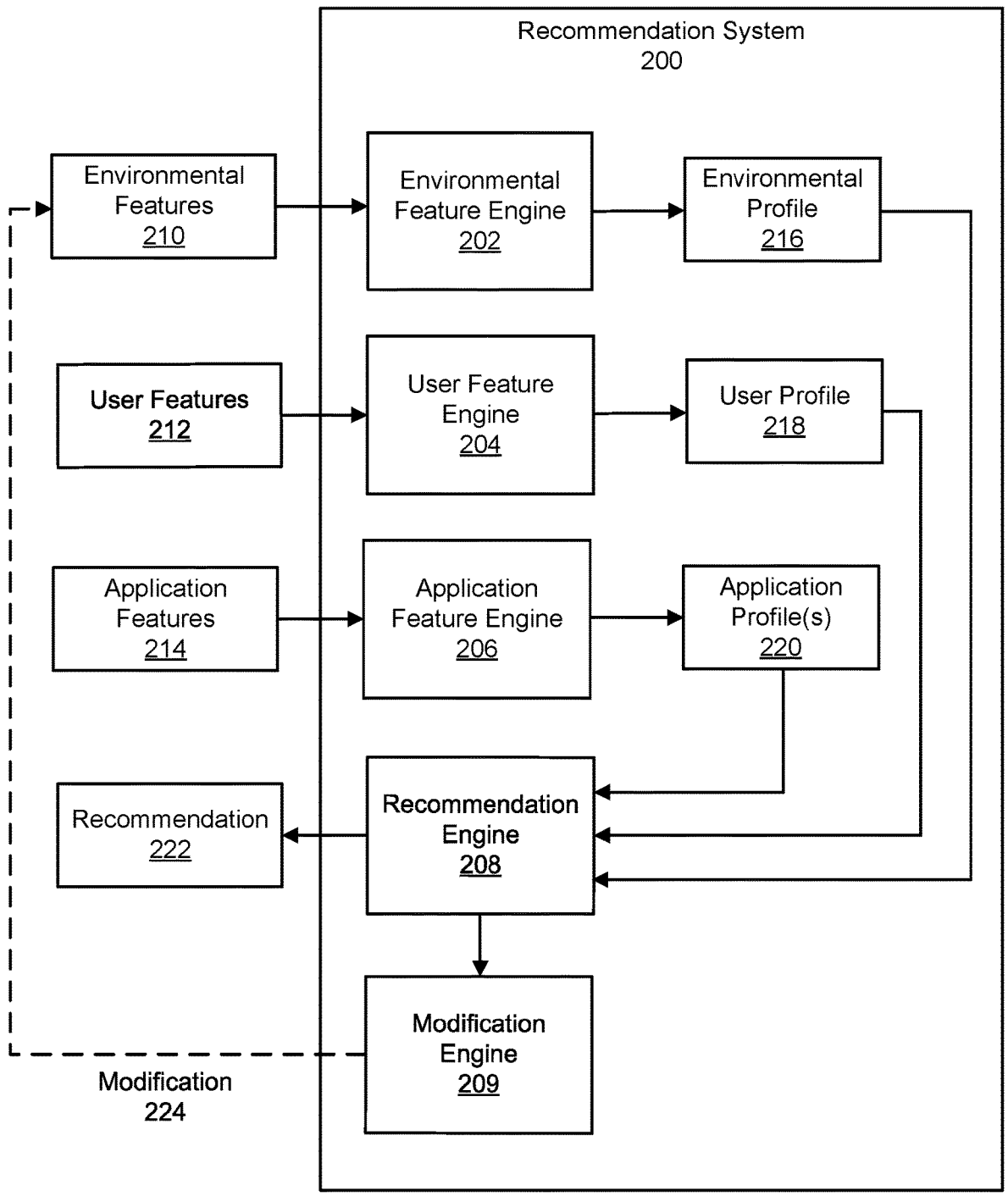
FIG. 2 is a block diagram illustrating an example of a system for providing adaptive recommendations associated with extended reality environments, in accordance with some examples.

FIG. 2 is a block diagram illustrating an example of a recommendation system 200.

In some cases, the recommendation system 200 can include and/or be part of the extended reality system 100 in FIG. 1. For instance, the recommendation system 200 can correspond to all or a portion of the recommendation engine 122. As shown in FIG. 2, the recommendation system 200 can include one or more engines, including an environmental feature engine 202, a user feature engine 204, an application feature engine 206, a recommendation engine 208, and a modification engine 209. The engines of the recommendation system 200 can be configured to determine a recommendation 222. The recommendation 222 can include any number or type of adaptive recommendations configured to improve the XR experience of the user of the extended reality system 100.

In some cases, the recommendation system 200 can determine the recommendation 222 based at least in part on one or more environmental features (e.g., environmental features 210) associated with the real-world environment. In some cases, an environmental feature can include any element or aspect of the real-world environment that potentially impacts and/or changes interactions between the user and an XR-based application. For example, an environmental feature corresponding to a physical object (e.g., a wall, piece of furniture, flight of stairs, etc.) can prevent the user from being sufficiently mobile while interacting with an XR-based application that involves movement. In some examples, environmental features 210 can include a layout of physical objects within the real-world environment. For instance, environmental features 210 can include a floorplan of a room and/or building in which the recommendation system 200 is located. The floorplan can include information indicating the locations, sizes, and/or types of features such as rooms, walls, doors, windows, pieces of furniture, etc. In some examples, environmental features 210 can include ambient and/or geographical characteristics of the real-world environment. For instance, environmental features 210 can include a temperature of the environment, smells within the environment, a level of lighting within the environment, a type of the environment (e.g., whether the environment is a public space, inside a building, etc.), and the weather or climate of the environment, among others features. In further examples, environmental features 210 can include background activity within the real-world environment. For instance, environmental features 210 can include people talking, sitting, moving, etc. within the environment, pets within the environment, sounds within the environment (e.g., sounds from television, traffic, etc.), among other background activity. In further examples, environmental features 210 can include computing devices connected to a network within the real-world environment (e.g., a network to which the extended reality system 100 is connected). For instance, environmental features 210 can include laptops, desktops, tablets, mobile phones, internet-enabled televisions, gaming systems, Internet of things (IoT) devices (e.g., internet-enabled appliances such as thermostats), and/or any additional type of device that is connected to a network.

The environmental feature engine 202 can determine environmental features 210 using various techniques and/or devices. In some examples, the environmental feature engine 202 can scan the real-world environment to identify the physical layout and/or physical objects within the environment. For instance, the environmental feature engine 202 can scan the environment by analyzing image or video data captured by one or more cameras or image sensors (e.g., image sensor 102 of the extended reality system 100). The environmental feature engine 202 can detect one or more environmental features within image or video data by implementing one or more image processing techniques and/or computer vision techniques. The image processing techniques can include object detection algorithms, object recognition algorithms, facial recognition algorithms, any combination thereof, and/or other image processing techniques. In some examples, the environmental feature engine 202 can determine one or more environmental features based on previously generated or stored environmental data. For example, the environmental feature engine 202 can determine information about the physical layout of the environment by accessing blueprints or similar information associated with the environment. In another example, the environmental feature engine 202 can access a previous scan of the environment. The previous scan can be performed by the environmental feature engine 202, or by a different system or device. In some examples, the environmental feature engine 202 can determine ambient and/or physical conditions of the environment using sensors such as LIDAR sensors, audio sensors, thermometers, any combination thereof, and/or other sensors or devices. In further examples, the environmental feature engine 202 can determine the location of the real-world environment in which the extended reality system 100 is located using a network connection and/or a positioning system (e.g., a Global Positioning System (GPS)). The environmental feature engine 202 can detect any additional or alternative type of environmental feature using any suitable technique and/or device.

In some cases, the environmental feature engine 202 can determine specific scenarios and/or events occurring within the environment based on environmental features 210. Such determinations may be referred to as "scene understanding." For instance, the environmental feature engine 202 can infer and/or deduce a specific scenario within the environmental by analyzing multiple environmental factors. In an illustrative example, the environment feature engine 202 can determine that a person is cooking within a kitchen located adjacent to a room in which the recommendation system 200 is located based on the following factors: (1) a layout of the environment indicating the adjacent kitchen, (2) sounds within the adjacent kitchen corresponding to cooking devices (e.g., pans, mixers, blenders, oven timers, etc.) being used, (3) detecting a person in the adjacent kitchen, and (4) an increase in the temperature of the adjacent kitchen.

As shown in FIG. 2, the environmental feature engine 202 can determine an environmental profile 216 based at least in part on environmental features 210. The environmental profile 216 can represent a quantitative and/or qualitative summary, assessment, and/or description of the real-world environment. The environmental profile 216 can include individual environmental factors (e.g., the temperature of the environment, the type of room(s) associated with the environment, etc.), and/or specific events occurring within the environment. In some cases, the environmental feature engine 202 can generate and/or update the environmental profile 216 based on the extended reality system 100 being turned on or otherwise activated. For example, the environmental feature engine 202 can generate a new environmental profile 216 each time the extended reality system 100 is turned on. In other examples, the environmental feature engine 202 can update an existing environmental profile 216. For instance, the environmental feature engine 202 can save information about the physical layout, geographical location, Internet-enabled devices, etc. associated with a particular real-world environment. In response to detecting that the extended reality system 100 has been turned on in the particular real-world environment, the environmental feature engine 202 can identify one or more new environmental features, and incorporate the new environmental features into the environmental profile. In an illustrative example, the environmental feature engine 202 can determine that a piece of furniture has been added to or removed from a room, or determine that a person has left or entered the room. Further, the environmental feature engine 202 can store environmental profiles in connection with multiple environments. In an illustrative example, the environmental profile engine 202 can store one profile in connection with the user's living room, another profile in connection the user's office, and a further profile in connection with a building in which the extended reality system 100 has previously been used.

In some examples, the environmental feature engine 202 can generate the environmental profile 216 based at least in part on input provided from the user. For example, the environmental feature engine 202 can provide an interface (e.g., a graphical user interface) via which the user can enter various environmental features. In an illustrative example, the environmental feature engine 202 can prompt the user to input labels of rooms within the environment (e.g., the user can identify a living room, a kitchen, a bedroom, etc.). Additionally or alternatively, the environmental feature engine 202 can direct the user to scan the environment (e.g., move within the environment while the extended reality system 100 captures images of the environment). In some cases, the environmental feature engine 202 can use such user input as an initial environmental profile and update the initial environmental profile based on subsequently detected environmental features.

In some examples, the recommendation system 200 can determine the recommendation 222 based at least in part on one or more features of the user (e.g., user features 212). User features 212 can include any type or form of information associated with how the user interacts (or is able to interact) with XR-based applications. For example, user features 212 can include features that indicate and/or predict the ability of the user to enjoy or properly interact with an application within the current real-world environment. In some cases, user features 212 can include demographic information associated with the user. The demographic information can include the user's age, gender, nationality, ethnicity, among other information. In some examples, user features 212 can include the size of the user (e.g., the user's height and/or weight). User features 212 can also include physical abilities of the user (e.g., whether the user is capable of moving furniture, modifying furniture, walking, running, etc.). In further examples, user features 212 can include spatial permissions of the user. In an illustrative example, user features 212 can include that the user is permitted to use XR-based applications in the living room and the user's own bedroom and not permitted to use XR-based applications in the kitchen and other bedrooms. In another illustrate example, user features 212 can include that the user is permitted to use XR-based applications in one public park and not permitted to use XR-based applications in another public park. Further, user features 212 can include application restrictions imposed on the user. In an illustrative example, user features 212 can include particular applications and/or particular types of applications (e.g., applications with above a "teen" rating) the user is not permitted to use due to parental controls.

In some examples, user features 212 can include information about the user's historical (e.g., previous) application use. For instance, user features 212 can include types of applications (e.g., gaming applications, exercise applications, teleconferencing applications, navigation applications, etc.) the user has previously used. In one example, user features 212 can include the user's preferred (e.g., most frequently used) types of applications. User features 212 can also identify specific applications the user has previously used. In some cases, user features 212 can include the user's skill level associated with one or more applications. In an illustrative example, if the user plays a gaming application, user features 212 can include the difficulty level with which the user plays, game achievements the user has made, etc. In some cases, the user features 212 can include user-specific contextual information associated with particular applications (or particular types of applications). For instance, the contextual information can include a time of day and/or day of the week the user typically uses a particular application. In another example, the contextual information can include types of XR devices (e.g., input devices) preferentially used by the user for particular applications. In another example, the contextual information can include a room in a house in which the user typically uses a particular application. Further, the contextual information can include behaviors, physiological states, and/or emotional states of the user associated with a particular application. For instance, user features 212 can include a typical mood and/or state of mind of the user (e.g., tired, awake, stressed, relaxed, happy, angry, etc.) associated with the particular application. User features 212 can also include current behaviors, physiological states, and/or emotional states of the user.

The user feature engine 204 can determine user features 212 using various techniques and/or devices. In some examples, the user feature engine 204 can scan the real-world environment to identify areas of the environment (e.g., individual rooms) associated with the user using particular applications (or particular types of applications). For instance, the user feature engine 204 can scan the environment by analyzing image or video data captured by one or more cameras or image sensors (e.g., image sensor 102 of the extended reality system 100). The user feature engine 204 can detect one or more user characteristics within image or video data by implementing one or more image processing techniques and/or computer vision techniques. In some examples, the user feature engine 204 can determine user features 212 by accessing an account associated with the user on an application platform (e.g., an application distribution platform, a cloud-based application platform, a gaming platform, etc.). For instance, the user feature engine 204 can extract, from the account, information about the user's application preferences and/or historical application use. In some examples, the user feature engine 204 can determine user features 212 using biometric sensors. For instance, the user feature engine 204 can utilize a voice detection sensor and/or a computer vision sensor to determine information such as the user's gender, age, and physical abilities, among other information. In another example, the user feature engine 204 can use physiological sensors (e.g., a Galvanic skin response (GSR) sensor, an electroencephalogram (EEG) device, an electrocardiogram (ECG) device, a photoplethysmography (PPG) sensor, a voice detection sensor, a computer vision sensor, etc.) to determine emotional and/or physiological states of the user. The user feature engine 204 can detect any additional or alternative type of user feature using any suitable technique and/or device.

As shown in FIG. 2, the user feature engine 204 can determine a user profile 218 based at least in part on user features 212. The user profile 218 can represent a quantitative and/or qualitative summary, assessment, and/or description of user features associated with the user's application preferences and/or contextual usage of various applications. For example, the user profile 218 can associate particular applications with particular environmental features corresponding to the user's historical use of the applications. In some cases, the user profile 218 can also represent a current state of the user. For instance, in response to detecting that the extended reality system 100 has been activated, the user feature engine 204 can determine updated physiological, emotional, and/or biological states of the user. These updated states can be incorporated into the user profile 218.

In some examples, the user feature engine 204 can generate the user profile 218 based at least in part on input provided from the user. For example, the user feature engine 204 can provide an interface via which the user can enter information such as demographic information, physical abilities, parental controls, and application preferences, among other information. In a non-limiting example, the user feature engine 204 can prompt the user to enter such information while setting up an account accessed via the extended reality system 100. In some cases, the user feature engine 204 can use such user input as an initial user profile and update the initial user profile based on subsequently detected user features.

In some cases, the recommendation system 200 can determine the recommendation 222 based at least in part on one or more application features (e.g., application features 214) associated with XR-based applications supported by the extended reality system 100. The extended reality system 100 can support various types of XR-based applications, including gaming applications, exercise applications, teleconferencing applications, and navigation applications, among others. In some cases, an application feature can include any characteristic of a real-world environment that facilitates and/or optimizes a user's experience with an XR-based application. Accordingly, in some examples, application features 214 can include environmental features that the application feature engine 206 determines to be beneficial and/or relevant to a particular XR-based application. For example, the environmental features can include a preferred and/or suggested size of a room in which the application is to be experienced. In an illustrative example, an application involving a large amount of physical movement (e.g., a fast-paced gaming application) may benefit from a large environment, whereas other applications (e.g., teleconferencing applications, stationary gaming applications, etc.) may be suitable for environments of various sizes. In some examples, the environmental features can include a preferred and/or suggested physical layout of the environment. For instance, application features 214 can include a preferred and/or suggested amount of clutter (e.g., furniture and/or other objects) within the environment, a preferred and/or suggested number of rooms within the environment, etc. In further examples, the environmental features can include a preferred and/or suggested type of environment (e.g., a public building, a private room, an outdoor environment, an indoor environment, etc.). In another example, the environmental features can include ambient features of the environment (e.g., a preferred and/or suggested level of lighting, level of sound, temperature, etc.).

In some cases, an application feature can include any characteristic of a user that is associated with the user enjoying an XR-based application and/or being capable of properly interacting with the XR-based application. Accordingly, in some examples, application features 214 can include user features that the application feature engine 206 determines to be beneficial and/or relevant to a particular XR-based application. For example, the user features can include whether the application is most suitable for a single user or multiple users (and/or whether the multiple users should be local or remote). In another example, the user features can include a size of users and/or physical abilities of users (e.g., walking, running, jumping, hearing, seeing, etc.) that are useful and/or required when interacting with the particular application.

In some examples, application features 214 can include hardware and/or software that is required and/or suggested for a particular XR-based application. For instance, application features 214 can include required and/or suggested XR devices (e.g., controllers, head-mounted displays, input devices, glasses, etc.), required and/or suggested power levels of the XR devices, required and/or suggested latencies of network connections, among other software or hardware characteristics.

In some cases, application features for a particular XR-based application can include additional applications that are similar to the particular application. For example, application features 214 can include one or more applications whose functions, themes, user experiences etc. have at least a threshold amount of similarity to the particular application. In an illustrative example, an application feature associated with a first-person shooter application can be another first-person shooter application. In further examples, application features 214 can include one or more applications that have been enjoyed (e.g., highly rated or reviewed) by users who have also enjoyed the particular application. In an illustrative example, if multiple users (e.g., a threshold number of users) enjoy both the particular application and an additional application (e.g., the users rate both applications above a threshold rating), the application feature engine 206 can determine that the additional application is an application feature associated with the particular application.

The application feature engine 206 can determine application features 214 using various techniques and/or devices. In some cases, the application feature engine 206 can determine application features for a particular application based on information associated with a plurality of users that have used the particular application. For example, the application feature engine 206 can be implemented as part of a cloud-based service configured for generating application profiles. In an illustrative example, the cloud-based service can include a cluster of servers and/or databases that communicate remotely with a plurality of XR systems. In this example, the cloud-based service can collect user profiles and/or environmental profiles generated by the plurality of XR systems. For instance, the plurality of XR systems can be configured to generate user profiles and/or environmental profiles and send the profiles to the cloud-based service. Additionally or alternatively, the application feature engine 206 can "crowdsource" application features. For example, the application feature engine 206 can analyze user reviews of multiple applications to determine applications that have been reviewed similarly by similar users (e.g., users with similar user profiles).

As shown in FIG. 2, the application feature engine 206 can determine one or more application profiles 220 based at least in part on application features 214. In some cases, one application profile within application profile 220 can correspond to a single application. For instance, the application feature engine 206 can generate multiple application profiles each corresponding to a different application. In some cases, the application feature engine 206 can generate an application profile for a particular application by processing user profiles and/or environmental profiles associated with a plurality of users that have used the particular application. The application feature engine 206 can utilize various types of data processing techniques to process the profiles. For example, the application feature engine 206 can implement one or more data mining techniques, classification techniques, clustering techniques, prediction techniques, pattern tracking techniques, any combination thereof, and/or other data processing techniques. Additionally or alternatively, the application feature engine 206 can implement one or more machine learning algorithms, including a neural network (NN), such as a convolutional neural network (CNN), a time delay neural network (TDNN), a deep feed forward neural network (DFFNN), a recurrent neural network (RNN), an auto encoder (AE), a variation AE (VAE), a denoising AE (DAE), a sparse AE (SAE), a markov chain (MC), a perceptron, or some combination thereof. The machine learning algorithm may be a supervised learning algorithm, an unsupervised learning algorithm, a semi-supervised learning algorithm, a generative adversarial network (GAN) based learning algorithm, any combination thereof, or other learning techniques.

As shown in FIG. 2, the recommendation engine 208 can determine the recommendation 222 based at least in part on the environmental profile 216, the user profile 218, and the one or more application profiles 220. In some cases, the recommendation 222 can include one or more applications that the recommendation engine 208 determines to be suitable for use by the user of the extended reality system 100 within the real-world environment in which the extended reality system 100 is located. In one example, the suitable applications can include a subset of the applications corresponding to the application profiles 220. To determine the suitable applications, the recommendation engine 208 can compare the environmental profile 216 and/or the user profile 218 with the application profiles 220. In an illustrative example, the recommendation engine 208 can compare the profiles by determining match scores between all or a portion of the application profiles 220 and the environmental profile 216 and/or the user profile 218. As used herein, a match score associated with an application profile can represent a quantitative assessment of the compatibility between the corresponding application and the user and/or the current real-world environment of the user. A compatibility score above a threshold value can indicate that the user is likely to enjoy and/or be capable of properly interacting with the application given the current real-world environment and the current state of the user. In some cases, a match score can include a numerical score within a predetermined range. In an illustrative example, the range can include a range of 0-1, a range of 1-10, or a range of 0%-100%, where a higher score is associated with a higher amount of compatibility. In some examples, the recommendation engine 208 can determine suitable applications as applications corresponding to match scores that exceed or are above a threshold match score. For example, if match scores are determined within a range of 0%-100%, the recommendation engine 208 can determine suitable applications as applications corresponding to match scores that meet or exceed 60%. Additionally or alternatively, the recommendation engine 208 can determine suitable applications as applications corresponding to a certain number and/or percentage of the highest match scores. In an illustrative example, if the application profiles 220 include 50 application profiles, the recommendation engine 208 can identify applications corresponding to the highest 5 match scores.

In some cases, the recommendation engine 208 can determine an overall match score associated with one of the application profiles 220 based on a first match score between the application profile and the environmental profile 216 and a second match score between the application profile and the user profile 218. For example, the recommendation engine 208 can determine separate match scores and then combine the match scores. In some cases, the recommendation engine 208 can determine the overall match score by calculating a simple average of the match scores. Such a match score may equally reflect and/or be influenced by the environmental profile 216 and the user profile 218. In some cases, the recommendation engine 208 can determine an overall match score by weighting the two match scores. In one example, weighting the two match scores can include assigning a numerical weight to each match score (e.g., assigning a weight of 0.7 to the match score associated with the user profile 218 and a weight of 0.3 to the match score associated with the environmental profile 216).

Additionally or alternatively, weighting the match scores can include disregarding all or a portion of the features from the profiles when determining the match scores. In one example, the recommendation engine 208 can determine a match score based on the environmental profile 216. For instance, the recommendation engine 208 can compare features of the environmental profile 216 with features of one or more application profiles (while disregarding the user profile 218). In another example, the recommendation engine 208 can determine a match score based on the user profile 218. For instance, the recommendation engine 208 can compare features of the user profile 218 with features of one or more application profiles (while disregarding the environmental profile 216).

In further examples, the recommendation engine 208 can selectively compare certain features of one or more application profiles with features of the environmental profile 216 and/or the user profile 218. As described above, an application profile can include features associated with user characteristics and features associated with environmental characteristics. In one example, the recommendation engine 208 can determine a match score by comparing features of the user profile 218 with features of one or more application profiles associated with environmental characteristics. In an illustrative example, such a selective comparison can determine that an application designed for a large environment (e.g., due to a high level of activity involved in using the application) is likely unsuitable for a user that does not enjoy highly active applications (even if the user is located in a large room). In another illustrative example, the recommendation engine 208 can determine that the application designed for the large environment is likely suitable for a user that has a high level of athletic ability. In other cases, the recommendation engine 208 can determine a match score by comparing features of the environmental profile 216 with features of one or more application profiles associated with user characteristics. In an illustrative example, such a selective comparison can determine that an application designed for tall users is likely unsuitable for a user located within a small and/or cluttered environment. In another illustrative example, the recommendation engine 208 can determine that the application designed for tall users is likely suitable for a user that is both tall and located in a large environment.

The recommendation engine 208 can select a type of match score to be determined based on various factors. For example, the recommendation engine 208 can detect user input corresponding to a particular type of match score. In another example, the recommendation engine 208 can select a type of match score based on the amount and/or type of information within the user profile 218 and/or the environmental profile 216. For example, the recommendation engine 208 can disregard portions of the profiles that do not contain a sufficient amount of information.

After determining one or more applications suitable for use by the user within the real-world environment, the recommendation engine 208 can output an indication of the applications. The indication of the applications can correspond to the recommendation 222. In some cases, the recommendation 222 can include a list of names corresponding to the suitable applications. For instance, the list of names can be viewed on or through a display of the extended reality system 100. In some cases, the recommendation engine 208 can also display match scores corresponding to each application.

In some examples, the modification engine 209 can determine one or more modifications (e.g., a modification 224) associated with an application. The application can be an application recommended by the recommendation engine 208 and/or an application selected by the user to be launched by the extended reality system 100. The modification 224 can include any number or type of modifications configured to improve interactions between the user and the application while the user is within the current real-world environment. In one example, the modification 224 can include a modification to the real-world environment. For instance, the modification 224 can include the user moving to a different portion of the real-world environment that is more suitable for the application. In an illustrative example, the modification 224 can include the user moving to a different room that has a physical layout, ambient noise level, and/or ambient light level more suitable for the application. In another illustrative example, the modification 224 can include connecting adjacent rooms to form a bigger environment (e.g., a bigger "game space"). In a further illustrative example, the modification 224 can include segmenting adjoining rooms (or segmenting a single room into multiple regions) in order to create boundaries (e.g., separate "game spaces) for multiple users. In another example, the modification 224 can include moving one or more physical objects (e.g., pieces of furniture) within the environment (e.g., to enable a greater degree of movement). Additionally or alternatively, the modification 224 can include modifying or augmenting a piece of furniture (e.g., collapsing or expanding a table). Further, the modification engine 209 can generate and output instructions directing the user how to modify or augment a piece of furniture. For example, the modification engine 209 can provide, to the user, specific steps involved in adding or removing a table leaf. In an additional example, the modification 224 can include adjusting ambient characteristics of the environment. For instance, the modification 224 can include lowering the volume of ambient noise to increase the user's ability to hear audio virtual content and/or decreasing the level of ambient light to increase the user's ability to see visual virtual content. In another example, the modification 224 can include recommendations for physical objects to be used as props within the application. In an illustrative example, the modification 224 may include a recommendation to use a certain piece of furniture as a "base" within a team-based application.

In some cases, the modification 224 can include a modification to one or more settings of the extended reality system 100 and/or the application. For example, the modification 224 can include changing a difficulty level or mode of the application. For instance, if the current environment is too cluttered for a multi-player game, the modification 224 can include selecting a single-player mode. In some cases, the modification engine 209 can determine modification 224 by comparing and/or analyzing the environmental profile 216, the user profile 218, and/or an application profile corresponding to the selected application. For instance, the modification engine 209 can identify features within the environmental profile 216 and/or the user profile 218 that do not currently match or correspond to features within the game profile. The modification engine 209 can then recommend changes that increase the degree to which the features within the profiles match.

In some examples, the modification engine 209 can determine the modification 224 based at least in part on power costs associated with a recommended application. For example, the modification engine 209 can determine that a current environment of the user has a high level of ambient light, which may require the user to increase the brightness of the extended reality system 100 in order to properly interact with the application. The increased level of brightness may quickly deplete a battery of the extended reality system 100, resulting in the user being able to use the application for only a short amount of time (e.g., 30 minutes, 1 hour, etc.) To increase the amount of time the user can interact with the application, the modification engine 209 can suggest the user move to a different environment (e.g., a different room) that is dimmer. In another example, the modification engine 209 can determine the modification 224 based on the current battery state of various XR devices owned by the user. For instance, the modification engine 209 can determine that the user has two or more XR devices capable of running an application. The modification engine 209 can determine, based on the charge level and/or drain rate of the batteries of the devices, which device will enable the longest duration of application use. The modification engine 209 can then recommend the user select that device for running the application.

In some cases, the modification engine 209 can determine modification 224 based on detecting that an application has been selected to be launched within the extended reality system 100. For instance, the modification engine 209 can detect user input corresponding to selection of the application to be launched and determine the modification 224 in response to the input. Additionally or alternatively, the modification engine 209 can determine modifications associated with one or more recommended applications (e.g., before detecting user input corresponding to selection of an application to be launched). In some cases, the modification engine 209 can output an indication of any determined modifications that can be viewed on or through a display of the extended reality system 100. In these cases, the user can determine whether to implement the modifications. In some cases, the modification engine 209 can implement all or a portion of the modifications to the environment automatically and/or autonomously (e.g., via smart home devices and/or IoT devices). In an illustrative example, the modification engine 209 can indicate possible modifications involving changes to the environment to the user, and automatically perform modifications involving changes to settings of the application and/or the extended reality system 100.

In some examples, the modification 224 can affect one or more of the environmental features 210. For instance, as shown by the dashed arrow in FIG. 2, the modification 224 can be applied to the environmental features 210. Accordingly, implementing the modification 224 can change the environmental profile 216. In some cases, if the modification 224 results in changes to the environmental profile 216, the recommendation system 200 can determine one or more additional modifications and/or application recommendations based on the changes. For example, the recommendation system 200 can determine that the modification results in environmental features compatible with an application that was not previously recommended. Additionally or alternatively, the recommendation system 200 can determine that a subsequent modification to the real-world environment is likely to correspond to an increased compatibility with a previously recommended application.

Figure 3:
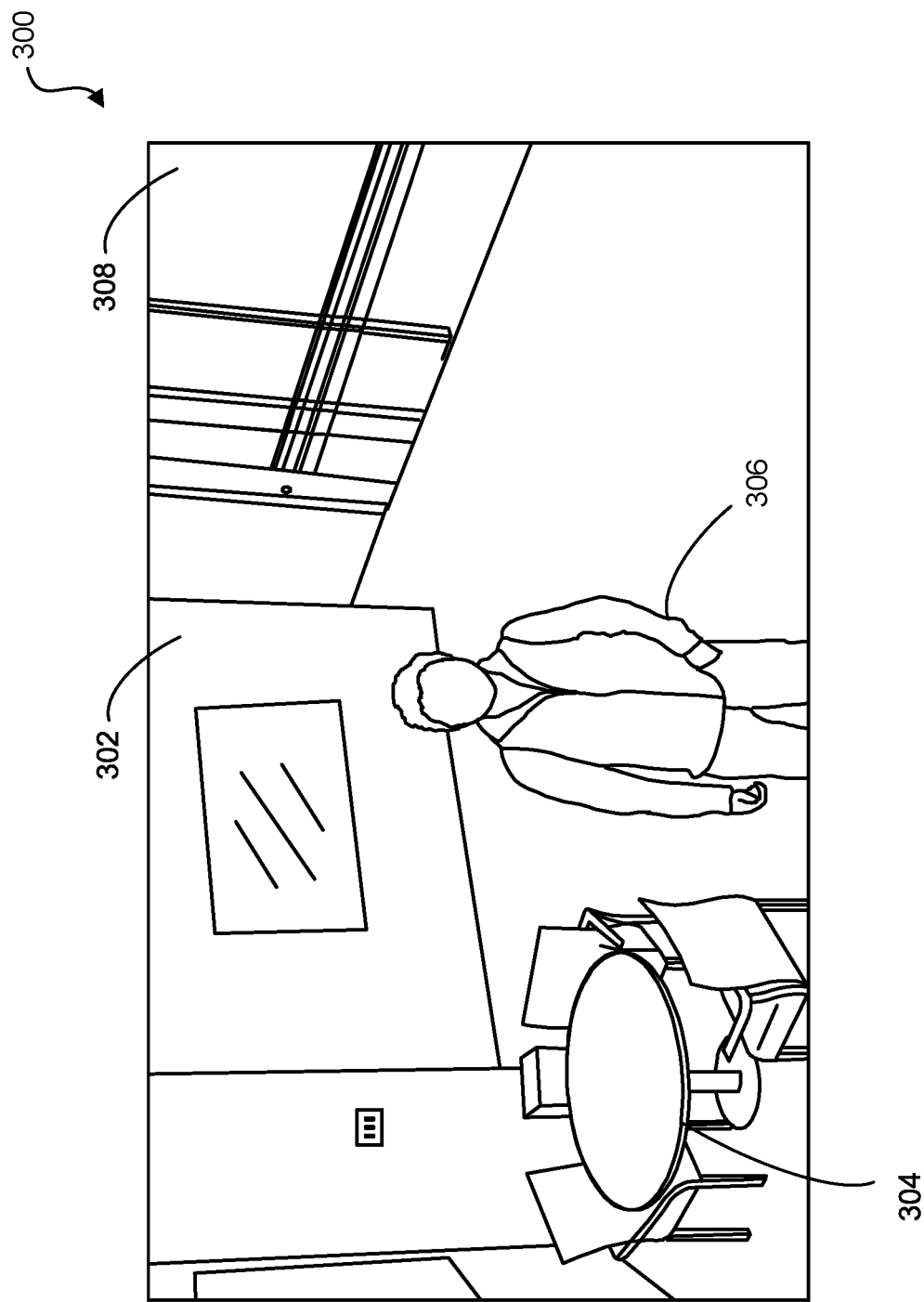
FIG. 3 is an illustration of a real-world environment in which an extended reality system is located, in accordance with some examples.

FIG. 3 illustrates an example environment 300 in which an XR system (e.g., the extended reality system 100 of FIG. 1) is located. In this example, the recommendation system 200 of FIG. 2 can determine environmental features associated with the environment 300. For instance, the recommendation system 200 can detect a wall 302, a table 304, a person 306, and a window 308. The recommendation system 200 can determine any number or type of additional environmental features, including a geographical location of the environment 300, a level of noise within the environment 300, a level of lighting within the environment 300, and a size of the environment, among others. In an illustrative example, the recommendation system 200 can determine that the environment 300 has a moderate level of clutter (e.g., due to the presence of the table 304 and the person 306). The recommendation system 200 can also determine that the environment 300 has a large size (e.g., due to the locations of the wall 302 and the window 308). In addition, the recommendation system 200 can determine that the environment 300 has a moderate level of background noise (e.g., due to speech of the person 306). The recommendation system 200 can incorporate these environmental features (and any additional environmental features) into an environmental profile associated with the environment 300.

In some cases, the recommendation system 200 may have previously determined and stored at least a portion of the environmental profile associated with the environment 300. For example, the recommendation system 200 may have previously determined and stored the size and/or physical layout of the environment 300. In this example, the recommendation system 200 can update the environmental profile based on detecting new and/or updated environmental features. For instance, the recommendation system 200 can determine the current level of ambient noise and/or ambient light within the environment 300. The recommendation system 200 can incorporate the new and/or updated environmental features into the existing environmental profile.

In some cases, the recommendation system 200 can determine user features associated with the user of the extended reality system 200. For example, the recommendation system 200 can determine demographic information associated with the user. The recommendation system 200 can also determine application preferences and/or historical application usage associated with the user. In an illustrative example, the recommendation system 200 can determine that the user is 25-30 years old, female, has no physical impairments, and has a history of enjoying multi-player games on weekends and enjoying games involving animals when in a relaxed state. The recommendation system 200 can incorporate these user features (and any additional user features) into a user profile associated with the user.

In some cases, the recommendation system 200 may have previously determined and stored at least a portion of the user profile. For example, the recommendation system 200 may have previously stored the demographic information and the application preferences associated with the user. In this example, the recommendation system 200 can update the user profile based on detecting new and/or updated user characteristics. For instance, the recommendation system 200 can determine the current physiological and/or emotional state of the user. The recommendation system 200 can incorporate the new and/or updated user characteristics into the existing user profile.

Figure 4A:
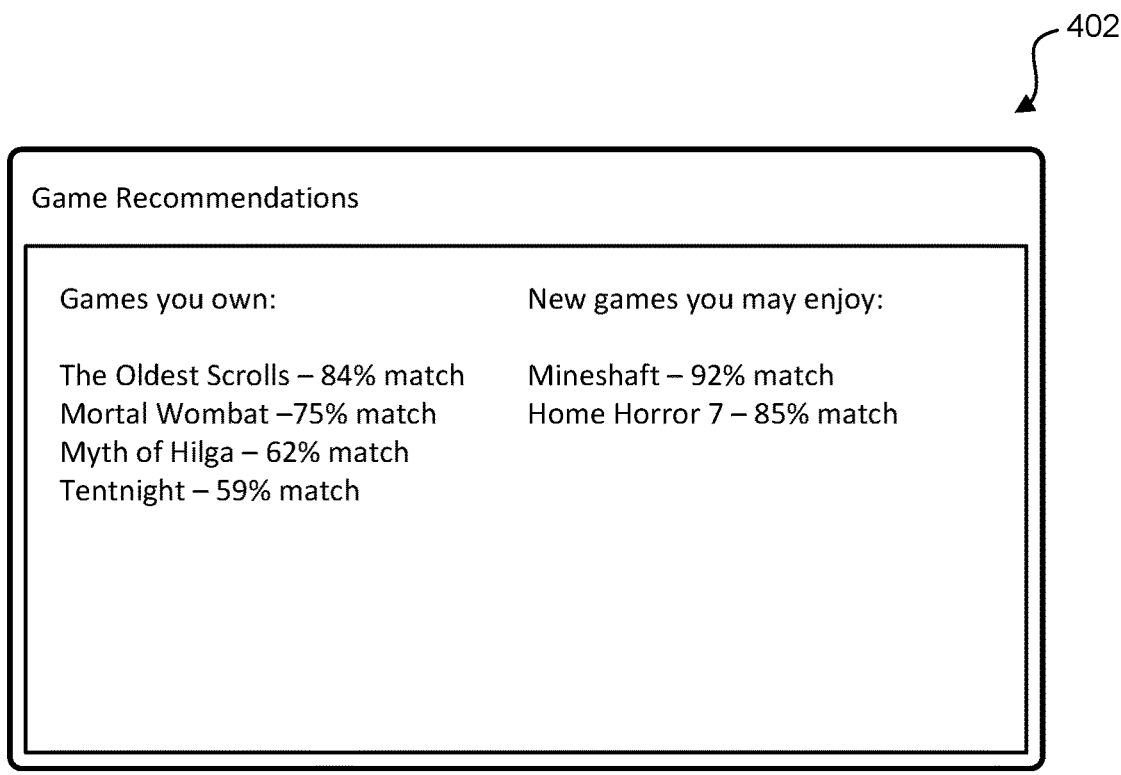
FIG. 4A and FIG. 4B are illustrations of adaptive recommendations provided in association with extended reality environments, in accordance with some examples.

FIG. 4A illustrates an example user interface 402 that displays a recommendation of one or more applications suitable for use within the environment 300 shown in FIG. 3. The recommendation of the one or more applications can correspond to an example of the recommendation 222 output by the recommendation system 200 of FIG. 2. The recommendation system 200 can determine the one or more recommended applications based at least in part on a comparison between one or more application profiles and the environmental profile associated with the environment 300 and/or the user profile of the user of the extended reality system 100. For example, the recommendation system 200 can determine a match score for each of a plurality of application profiles. In this example, the recommendation system 200 can output a list of names of the recommended applications that can be viewed on or through a display of the extended reality system 100. As shown in FIG. 4A, the recommendation system 200 can display a match score next to each application name. As also shown in FIG. 4A, the recommended applications can include applications (e.g., games) the user owns (e.g., has bought or downloaded) and/or new applications. The user interface 402 can enable the user to select one of the recommended applications to be launched within the extended reality system 100. The recommendation system 200 can also enable the user to select an alternative application (e.g., by closing the user interface 402).

Figure 4B:
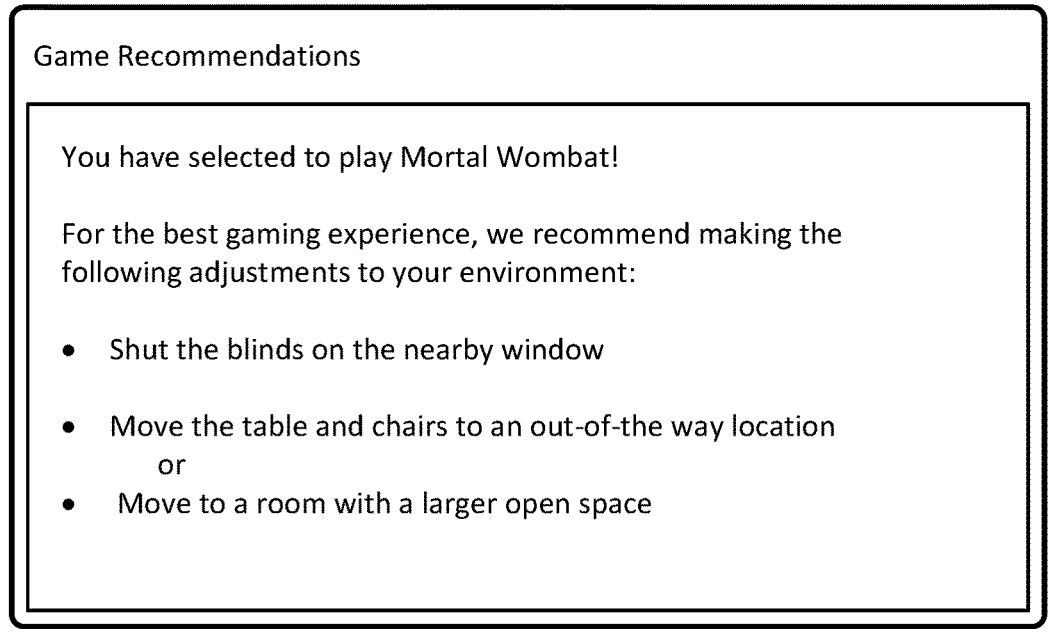

FIG. 4B illustrates an example user interface 404 that displays a recommendation of one or more modifications associated with the environment 300 shown in FIG. 3. The recommendation of the one or more modifications can correspond to an example of the modification 224 output by the recommendation system 200 of FIG. 2. In this example, the recommendation system 200 can determine the one or more modifications based on the user selecting an application (i.e., "Mortal Wombat") displayed within the user interface 402 of FIG. 4A. In addition, the recommendation system 200 can determine the one or more modifications based at least in part on a comparison between an application profile associated with the selected application and the environmental profile associated with the environment 300 and/or the user profile of the user of the extended reality system 100. For example, the recommendation system 200 can determine modifications that are configured to increase the match score associated with the selected application.

Figure 5:
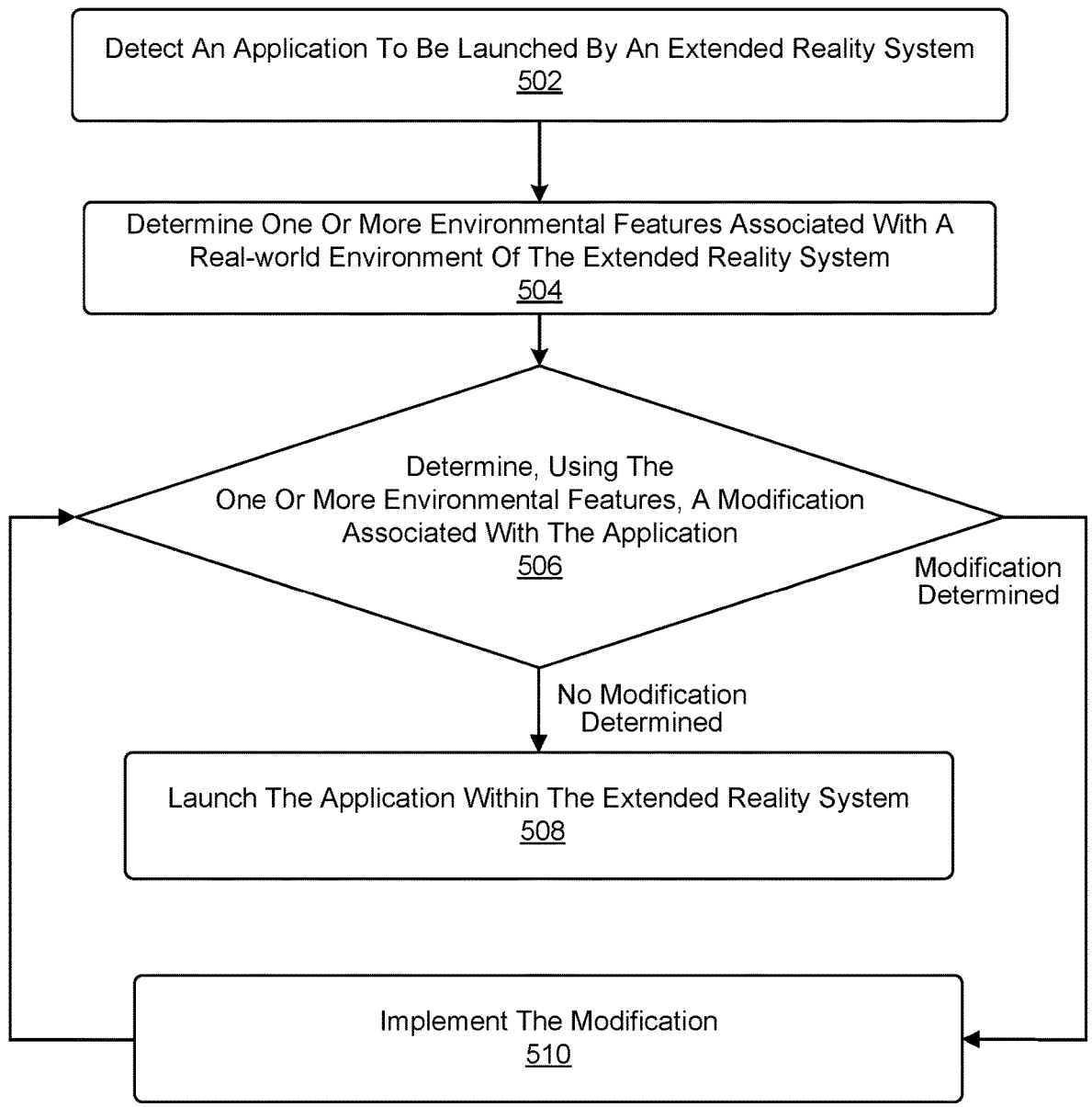
FIG. 5 is a flow diagram illustrating an example of a process for providing adaptive recommendations associated with extended reality environments, in accordance with some examples.

FIG. 5 is a flow diagram illustrating an example process 500 for providing recommendations for extended reality systems. For the sake of clarity, the process 500 is described with references to the recommendation system 200 shown in FIG. 2. The steps or operations outlined herein are examples and can be implemented in any combination thereof, including combinations that exclude, add, or modify certain steps or operations.

At block 502, the process 500 includes detecting an application to be launched by an extended reality system. For example, the recommendation system 200 can detect that the user is interacting with the application (or wishes to interact with the application). In one example, the recommendation system 200 can detect user input corresponding to selection of the application within a user interface of the extended reality system. In some cases, the application can be an application recommended by the recommendation system 200 (e.g., based on a comparison between an application profile associated with the application and the environmental profile 218 and/or the user profile 218). In an illustrative example, the recommendation system 200 can detect user input corresponding to a selection of an application displayed within the user interface 402 shown in FIG. 4A. In other examples, the application can be an application not recommended by the recommendation system 200.

At block 504, the process 500 includes determining one or more environmental features associated with a real-world environment of the extended reality system. For example, the recommendation system 200 can detect and/or retrieve environmental features of the environmental profile 216. In some cases, the recommendation system 200 can also detect and/or retrieve user features within the user profile 218. Further, the recommendation system 200 can detect and/or retrieve application features within an application profile associated with the application. In some examples, the recommendation system 200 can also determine user profiles associated with a plurality of additional users (e.g., users that have previously used the application or similar applications) and/or environmental profiles associated with the plurality of users.

At block 506, the process 500 includes optionally determining, using the one or more environmental features, a modification associated with the application. For example, the recommendation system 200 can determine whether a modification can be implemented (or should be implemented) by the user and/or the extended reality system. In some cases, the recommendation system 200 can determine that the current configuration of the real-world environment and/or application is suitable or ideal (e.g., in view of the one or more user features). Thus, the recommendation system 200 can determine that modifications associated with the application may be unnecessary. In one example, if the recommendation system 200 determines that modifications may be unnecessary, the recommendation system 200 can determine no modification at block 602. In another example, the recommendation system 200 can determine no modification at block 602 based on detecting user input declining modifications. If the recommendation system 200 determines no modification at block 506, the process 500 proceeds to block 508. At block 508, the process 500 includes launching the application within the extended reality system. For example, the recommendation system 200 can direct the extended reality system to run and/or execute the application.

In other cases, the recommendation system 200 can determine that the current configuration of the real-world environment and/or application can be improved by one or more modifications. In these cases, the recommendation system 200 can determine a modification at block 506. In one example, the modification can be associated with the real-world environment. In another example, the modification can be associated with one or more settings of the application. In some examples, the recommendation system 200 can determine the modification based at least in part on the environmental features associated with the plurality of users and/or the user features associated with the plurality of users. For instance, the recommendation system 200 can determine a modification suitable for the user, the application, and/or the current real-world environment of the user based on historical data associated with interactions between additional users and the application within various real-world environments.

If the recommendation system 200 determines a modification at block 506, the process 500 proceeds to block 510. At block 510, the modification can be implemented. The modification can be implemented by the extended reality system and/or by the user. For example, if the modification is associated with the real-world environment, the recommendation system 200 can output (e.g., within a display of the extended reality system), an indication of the modification to the user. In an illustrative example, the recommendation system 200 can display instructions directing the user how to implement the modification. In this way, the user can selectively implement the modification. In another example, if the modification is associated with settings of the application, the recommendation system 200 can request (e.g., within the display of the extended reality device) the user to provide input accepting or declining the modification. In a further example, the recommendation system 200 can autonomously and/or automatically implement the modification (e.g., without user input or involvement).

From block 510, the process 500 can return to block 506. For example, the recommendation system 200 can determine whether an additional or alternative modification is likely and/or expected to improve interactions between the user and the application within the real-world environment. In some cases, the recommendation system 200 can determine an additional modification based at least in part on changes to the configuration of the real-world environment and/or the application caused by implementing the previously determined modification. For example, the recommendation system 200 can update the environmental profile 216 and/or the user profile 218 as appropriate, and determine a new modification based on the updated profiles. In other examples, the recommendation system 200 can determine a new modification that is unrelated to and/or unaffected by the previously determined modification. In some cases, the process 500 can continue to cycle through blocks 506 and 510 until no modification is determined at block 506, at which point the process 500 can proceed to block 508.

FIG. 6 is a flow diagram illustrating an example process 600 for providing recommendations for extended reality systems. For the sake of clarity, the process 600 is described with references to the recommendation system 200 shown in FIG. 2. The steps or operations outlined herein are examples and can be implemented in any combination thereof, including combinations that exclude, add, or modify certain steps or operations.

At block 602, the process 600 includes determining one or more environmental features associated with a real-world environment of an extended reality system. For example, the recommendation system 200 can determine the environmental profile 216. In some cases, the recommendation system 200 can determine the one or more environmental features based on a scan of the real-world environment. In one example, the recommendation system 200 can cause the scan of the real-world environment to be performed by an image sensor of the extended reality system. In other examples, the recommendation system 200 can determine the one or more environmental features based on previously stored data indicating the one or more environmental features. Further, the recommendation system 200 can determine the one or more environmental features based on image data associated with the real-world environment. The image data can be captured by an image sensor of the extended reality system. In one example, the recommendation system 200 can determine a layout of one or more physical objects within the real-world environment based at least in part on the image data. Additionally or alternatively, the recommendation system 200 can determine activity of one or more people within the real-world environment based at least in part on the image data. In some cases, the recommendation system 200 can determine the one or more environmental features based on audio data associated with the real-world environment captured by an audio sensor of the extended reality system. For example, the recommendation system 200 can determine activity of one or more people within the real-world environment based at least in part on the audio data. In further examples, the recommendation system 200 can determine the one or more environmental features based at least in part on detecting one or more network-enabled devices within the real-world environment based on network communication with the one or more network-enabled devices.

At block 604, the process 600 includes determining one or more user features associated with a user of the extended reality system. For example, the recommendation system 200 can determine the user profile 218. In some cases, the recommendation system 200 can determine the one or more user features based at least in part on user data obtained using one or more biological sensors of the extended reality system. The user data can be associated with a physiological state and/or an emotional state of the user. In some examples, the recommendation system 200 can determine the one or more user features based on user input indicating at least one of an age of the user, a gender of the user, a geographic location of the user, a height of the user, and a weight of the user. In further examples, the recommendation system 200 can determine the user features based on monitoring application usage patterns of the user to determine application preferences of the user.

At block 606, the process 600 includes outputting, based on the one or more environmental features and the one or more user features, a notification associated with at least one application supported by the extended reality system. For example, the recommendation system 200 can determine, based on the one or more environmental features and the one or more user features, one or more applications suitable for use by the user in the real-world environment of the extended reality system. In some examples, the notification associated with the at least one application includes a recommendation of the at least one application. For instance, the recommendation of the at least one application can be determined based on the one or more environmental features and the one or more user features. In some examples, the notification associated with the at least one application includes a recommendation of at least one modification associated with the at least one application (e.g., modifying an application that the user has selected).

In some cases, the recommendation system 200 can determine a match score indicating a level of compatibility between the at least one application and at least one of the one or more environmental features and the one or more user features. The recommendation system 200 can then determine whether the match score exceeds a threshold match score. In some examples, the recommendation system 200 can determine at least one application (e.g., determine to recommend the at least one application or a modification associated with the at least one application) based on determining the match score exceeds the threshold match score. In some cases, the recommendation system 200 can determine the match score based on determining one or more application features associated with the at least one application and comparing the one or more application features with at least one of the one or more environmental features and the one or more user features. In one example, the recommendation system 200 can determine the one or more application features based on accessing an application profile associated with the at least one application from a server. In some cases, the application profile can be generated based on application features determined by a plurality of extended reality systems.

In some examples, the recommendation system 200 can determine a plurality of applications supported by the extended reality system using the one or more environmental features and the one or more user features. For example, the recommendation system 200 can determine a plurality of match scores indicating levels of compatibility between the plurality of applications and at least the one or more environmental features. In another example, the recommendation system 200 can determine a plurality of match scores indicating levels of compatibility between the plurality of applications and at least the one or more user features.

At step 608, the process 600 includes providing a recommendation of the at least one application to the user. For example, the recommendation system 200 can output the recommendation 222 (e.g., within a display of the extended reality system). In some cases, if the recommendation system 200 determines a plurality of applications supported by the extended reality system, the recommendation system 200 can provide a recommendation of the plurality of applications to the user. For instance, the recommendation system 200 can display, on the display of the extended reality system, the plurality of match scores in association with the plurality of applications. In one example, the recommendation system 200 can display, within the display of the extended reality system, an indication of an application of the plurality of applications having a highest match score of the plurality of match scores.

In some cases, the recommendation of the at least one application can include a recommendation of at least one modification associated with the at least one application. For instance, the recommendation 222 can include and/or correspond to the modification 224. In one example, the recommendation system 200 can detect the user is interacting with the at least one application. The recommendation system 200 can then determine the at least one modification based on detecting the user is interacting with the at least one application. In one example, the at least one modification can be associated with the real-world environment. In another example, the at least one modification can be associated with one or more settings of the at least one application. Further, in some cases, the recommendation system 200 can determine the at least one modification based on environmental features associated with a plurality of users and/or based on user features associated with the plurality of users.

Figure 7:
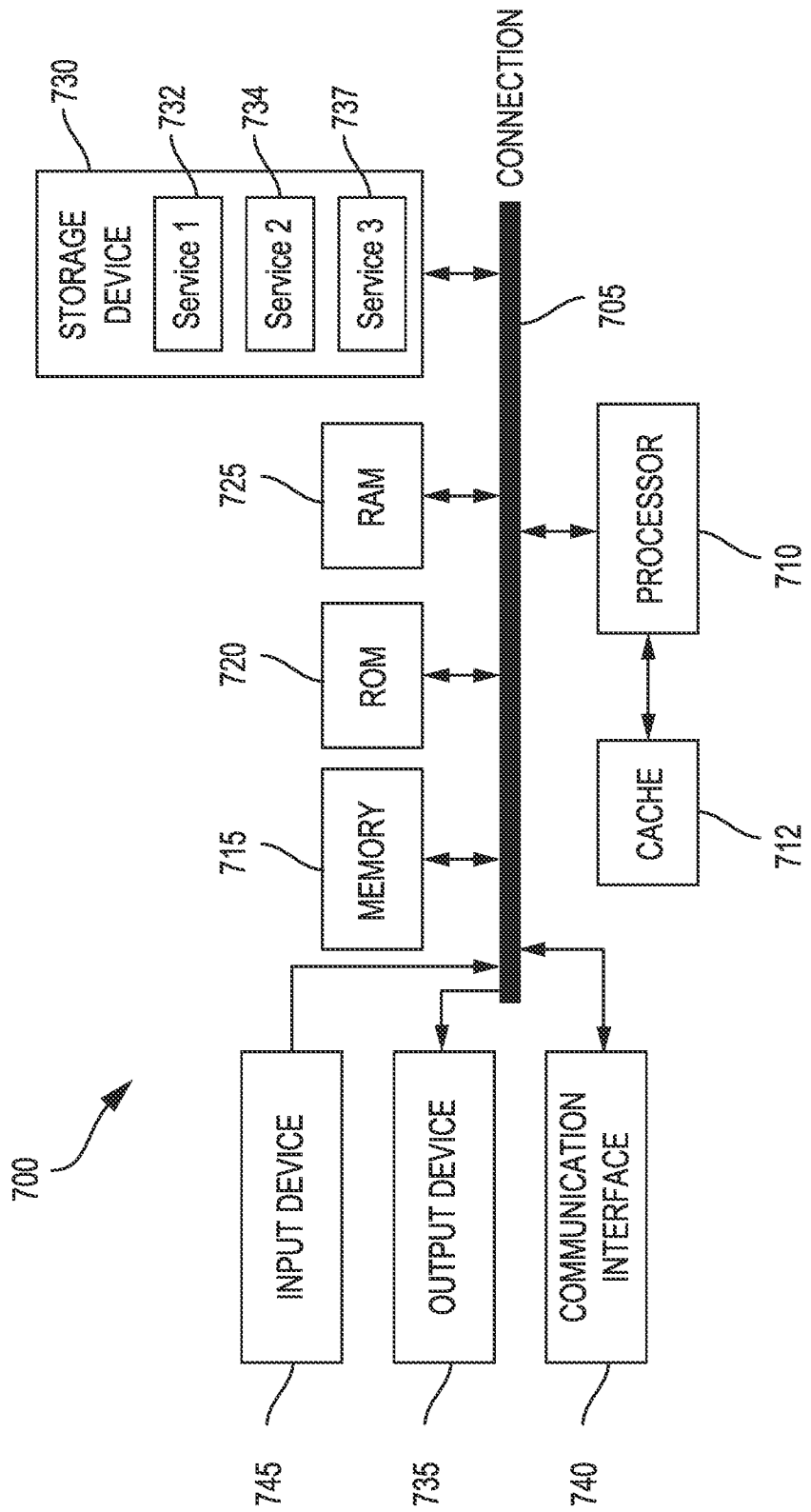
FIG. 7 is a diagram illustrating an example of a system for implementing certain aspects described herein.

FIG. 7 is a diagram illustrating an example of a system for implementing certain aspects of the present technology. In particular, FIG. 7 illustrates an example of computing system 700, which can be for example any computing device making up an internal computing system, a remote computing system, a camera, or any component thereof in which the components of the system are in communication with each other using connection 705. Connection 705 can be a physical connection using a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some examples, one or more of the described system components represent many such components each performing some or all of the functions for which the component is described. In some cases, the components can be physical or virtual devices.

Example computing system 700 includes at least one processing unit (CPU or processor) 710 and connection 705 that couples various system components including system memory 715, such as read-only memory (ROM) 720 and random access memory (RAM) 725 to processor 710. Computing system 700 can include a cache 712 of high-speed memory connected directly with, in close proximity to, or integrated as part of processor 710.

Processor 710 can include any general purpose processor and a hardware service or software service, such as services 732, 734, and 737 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms. In some instances, multimodal systems can enable a user to provide multiple types of input/output to communicate with computing system 700. Computing system 700 can include communication interface 740, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, a magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 730 can include software services, servers, services, etc., that when the code that defines such software is executed by the processor 710, it causes the system to perform a function. In some examples, a hardware service that performs a particular function can include the software component stored in a computer-readable medium in connection with the necessary hardware components, such as processor 710, connection 705, output device 735, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Aspect 1: A method of providing recommendations for extended reality systems, the method comprising: determining one or more environmental features associated with a real-world environment of an extended reality system; determining one or more user features associated with a user of the extended reality system; and outputting, based on the one or more environmental features and the one or more user features, a notification associated with at least one application supported by the extended reality system.

Aspect 2: The method of Aspect 1, wherein the notification associated with the at least one application includes a recommendation of the at least one application, the recommendation of the at least one application being determined based on the one or more environmental features and the one or more user features. In some cases, outputting the indication of the at least one application includes providing or outputting a recommendation of the at least one application on a display of the extended reality system.

Aspect 3: The method of any of Aspect 1 or Aspect 2, wherein the notification associated with the at least one application includes a recommendation of at least one modification associated with the at least one application.

Aspect 4: The method of Aspect 3, further comprising: detecting the user is interacting with the at least one application; and determining the at least one modification associated with the at least one application based on detecting the user is interacting with the at least one application.

Aspect 5: The method of any one of Aspect 3 or Aspect 4, wherein the at least one modification is associated with the real-world environment.

Aspect 6: The method of any one of Aspects 3 to 5, wherein the at least one modification is associated with one or more settings of the at least one application.

Aspect 7: The method of any one of Aspects 3 to 6, further comprising determining the at least one modification based on at least one of environmental features associated with a plurality of users and user features associated with the plurality of users.

Aspect 8: The method of any of Aspects 1 to 7, further comprising determining the one or more environmental features based on a scan of the real-world environment.

Aspect 9: The method of Aspect 8, further comprising causing the scan of the real-world environment, the scan of the real-world environment being performed by an image sensor of the extended reality system.

Aspect 10: The method of any of Aspects 1 to 9, further comprising determining the one or more environmental features based on previously stored data indicating the one or more environmental features.

Aspect 11: The method of any of Aspects 1 to 10, further comprising determining the one or more environmental features based at least in part on image data associated with the real-world environment captured by at least one image sensor of the extended reality system.

Aspect 12: The method of Aspect 11, further comprising determining a layout of one or more physical objects within the real-world environment based at least in part on the image data.

Aspect 13: The method of any one of Aspect 11 or Aspect 12, further comprising determining activity of one or more people within the real-world environment based at least in part on the image data.

Aspect 14: The method of any of Aspects 1 to 13, further comprising determining the one or more environmental features based at least in part on audio data associated with the real-world environment captured by an audio sensor of the extended reality system.

Aspect 15: The apparatus of Aspect 14, further comprising determining activity of one or more people within the real-world environment based at least in part on the audio data.

Aspect 16: The method of any of Aspects 1 to 15, further comprising determining the one or more environmental features based at least in part on detecting one or more network-enabled devices within the real-world environment based on network communication with the one or more network-enabled devices.

Aspect 17: The method of any of Aspects 1 to 16, further comprising determining the one or more user features based at least in part on user data obtained using one or more biological sensors of the extended reality system, wherein the user data is associated with a physiological state or an emotional state of the user.

Aspect 18: The method of any of Aspects 1 to 17, further comprising determining the one or more user features based on user input indicating at least one of an age of the user, a gender of the user, a geographic location of the user, a height of the user, and a weight of the user.

Aspect 19: The method of any of Aspects 1 to 18, further comprising determining the one or more user features based on monitoring application usage patterns of the user to determine application preferences of the user.

Aspect 20: The method of any of Aspects 1 to 19, further comprising: determining a match score indicating a level of compatibility between the at least one application and at least one of the one or more environmental features and the one or more user features; determining the match score exceeds a threshold match score; and determining the at least one application based on the match score exceeding the threshold match score.

Aspect 21: The method of any of Aspects 1 to 20, further comprising determining the match score based on: determining one or more application features associated with the at least one application; and comparing the one or more application features with at least one of the one or more environmental features and the one or more user features.

Aspect 22: The method of Aspect 21, further comprising determining the one or more application features based on accessing an application profile associated with the at least one application from a server, wherein the application profile is generated based on application features determined by a plurality of extended reality systems.

Aspect 23: The method of any of Aspects 1 to 22, further comprising: providing a recommendation of a plurality of applications to the user. In some cases, the method includes determining the plurality of applications supported by the extended reality system based on the one or more environmental features and the one or more user features.

Aspect 24: The method of Aspect 23, further comprising displaying, on a display of the extended reality system, a plurality of match scores in association with the plurality of applications, the plurality of match scores indicating levels of compatibility between the plurality of applications and at least one of the one or more environmental features and the one or more user features.

Aspect 25: The method of Aspect 24, further comprising determining the plurality of match scores based on at least the one or more environmental features.

Aspect 26: The method of any of Aspect 24 or Aspect 25, further comprising determining the plurality of match scores based on at least the one or more user features.

Aspect 27: The method of any of Aspects 24 to 26, further comprising display, within the display of the extended reality system, an indication of an application of the plurality of applications having a highest match score of the plurality of match scores.

Aspect 28: An apparatus for providing recommendations. The apparatus includes a memory (e.g., implemented in circuitry) and a processor (or multiple processors) coupled to the memory. The processor (or processors) is configured to: determine one or more environmental features associated with a real-world environment of the apparatus; determine one or more user features associated with a user of the apparatus; and output, based on the one or more environmental features and the one or more user features, a notification associated with at least one application supported by the apparatus.

Aspect 29: The apparatus of Aspect 28, wherein the notification associated with the at least one application includes a recommendation of the at least one application, the recommendation of the at least one application being determined based on the one or more environmental features and the one or more user features. In some cases, outputting the indication of the at least one application includes providing or outputting a recommendation of the at least one application on a display of the extended reality system Aspect 30: The apparatus of any one of Aspect 28 or Aspect 29, wherein the notification associated with the at least one application includes a recommendation of at least one modification associated with the at least one application.

Aspect 31: The apparatus of Aspect 30, wherein the processor is configured to: detect the user is interact with the at least one application; determine the at least one modification associated with the at least one application based on detect the user is interact with the at least one application.

Aspect 32: The apparatus of any one of Aspect 30 or Aspect 31, wherein the at least one modification is associated with the real-world environment.

Aspect 33: The apparatus of any one of Aspects 30 to 32, wherein the at least one modification is associated with one or more settings of the at least one application.

Aspect 34: The apparatus of any one of Aspects 30 to 33, wherein the processor is configured to: determine the at least one modification based on at least one of environmental features associated with a plurality of users and user features associated with the plurality of users.

Aspect 35: The apparatus of any of Aspects 28 to 34, wherein the processor is configured to: determine the one or more environmental features based on a scan of the real-world environment.

Aspect 36: The apparatus of Aspect 35, wherein the processor is configured to: cause the scan of the real-world environment, the scan of the real-world environment be performed by an image sensor of an apparatus.

Aspect 37: The apparatus of any of Aspects 28 to 36, wherein the processor is configured to: determine the one or more environmental features based on previously stored data indicating the one or more environmental features.

Aspect 38: The apparatus of any of Aspects 28 to 37, further comprising an image sensor configured to capture image data associated with the real-world environment, wherein the processor is configured to determine the one or more environmental features based at least in part on the image data.

Aspect 39: The apparatus of Aspect 38, wherein the processor is configured to: determine a layout of one or more physical objects within the real-world environment based at least in part on the image data.

Aspect 40: The apparatus of any one of Aspect 38 or Aspect 39, wherein the processor is configured to: determine activity of one or more people within the real-world environment based at least in part on the image data.

Aspect 41: The apparatus of any of Aspects 28 to 40, further comprising an audio sensor configured to capture audio data associated with the real-world environment, wherein the processor is configured to detect the one or more environmental features based at least in part on the audio data.

Aspect 42: The apparatus of Aspect 41, wherein the processor is configured to: determine activity of one or more people within the real-world environment based at least in part on the audio data.

Aspect 43: The apparatus of any of Aspects 28 to 42, wherein the processor is configured to: determine the one or more environmental features based at least in part on detecting one or more network-enabled devices within the real-world environment based on network communication with the one or more network-enabled devices.

Aspect 44: The apparatus of any of Aspects 28 to 43, further comprising one or more biological sensors configured to obtain user data associated with a physiological state or an emotional state of the user, wherein the processor is configured to determine the one or more user features based at least in part on the user data.

Aspect 45: The apparatus of any of Aspects 28 to 44, wherein the processor is configured to: determine the one or more user features based on user input indicating at least one of an age of the user, a gender of the user, a geographic location of the user, a height of the user, and a weight of the user.

Aspect 46: The apparatus of any of Aspects 28 to 45, wherein the processor is configured to: determine the one or more user features by monitor application usage patterns of the user to determine application preferences of the user.

Aspect 47: The apparatus of any of Aspects 28 to 46, wherein the processor is configured to: determine a match score indicate a level of compatibility between the at least one application and at least one of the one or more environmental features and the one or more user features; determine the match score exceeds a threshold match score; determine the at least one application based on the match score exceeding the threshold match score.

Aspect 48: The apparatus of any of Aspects 28 to 47, wherein the processor is configured to: determine the match score based on; determine one or more application features associated with the at least one application; compare the one or more application features with at least one of the one or more environmental features and the one or more user features.

Aspect 49: The apparatus of Aspect 48, wherein the processor is configured to: determine the one or more application features based on access an application profile associated with the at least one application from a server, wherein the application profile is generated based on application features determined by a plurality of extended reality systems.

Aspect 50: The apparatus of any of Aspects 28 to 47, wherein the processor is configured to: provide a recommendation of a plurality of applications to the user. In some cases, the method includes determining the plurality of applications supported by the extended reality system based on the one or more environmental features and the one or more user features.

Aspect 51: The apparatus of any of Aspects 28 to 50, wherein the processor is configured to: display, on a display of the apparatus, a plurality of match scores in association with the plurality of applications, the plurality of match scores indicating levels of compatibility between the plurality of applications and at least one of the one or more environmental features and the one or more user features.

Aspect 52: The apparatus of Aspect 51, wherein the processor is configured to: determine the plurality of match scores based on at least the one or more environmental features.

Aspect 53: The apparatus of any one of Aspect 51 or 52, wherein the processor is configured to: determine the plurality of match scores based on at least the one or more user features.

Aspect 54: The apparatus of Aspect 53, wherein the processor is further configured to: display, within the display of the apparatus, an indication of an application of the plurality of applications having a highest match score of the plurality of match scores.

Aspect 55: The apparatus of any one of Aspects 28 to 54, wherein the apparatus is an extended reality system.

Aspect 56: A computer-readable storage medium storing instructions that, when executed, cause one or more processors to perform any of the operations of Aspects 1 to 27.

Aspect 57: An apparatus comprising means for performing any of the operations of Aspects 1 to 27.

Aspect 58: A method operable on a user device. The method comprises: receiving signals from one or more detectors arranged to detect one or more environmental features associated with a real world environment in which the user device of an extended reality system is located; retrieving data from a user data store relating to one or more user features associated with interactions between the user and applications supported by the extended reality system; determining, using the signals from the one or more detectors and the data from the user store, at least one application supported by the extended reality system suitable for use by the user device in the real world environment; and facilitating launch of the at least one application on the user device.

Aspect 59: The method of Aspect 58, wherein facilitating launch of an application comprises automatically launching an application on the use device.

Aspect 60: The method of Aspect 58, wherein facilitating launch of an application comprises controlling the display to give an indication of an application to a user of the device.

Aspect 61: An apparatus including a memory and one or more processors (e.g., configured in circuitry) configured to: receive signals from one or more detectors arranged to detect one or more environmental features associated with a real world environment in which the user device of an extended reality system is located; retrieve data from a user data store relating to one or more user features associated with interactions between the user and applications supported by the extended reality system; determine, using the signals from the one or more detectors and the data from the user store, at least one application supported by the extended reality system suitable for use by the user device in the real world environment; and facilitate launch of the at least one application on the user device.

Aspect 62: The method of Aspect 61, wherein facilitating launch of an application comprises automatically launching an application on the use device.

Aspect 63: The method of Aspect 61, wherein facilitating launch of an application comprises controlling the display to give an indication of an application to a user of the device.

Aspect 64: A non-transitory computer-readable medium storing instructions that, when executed by one or more processors, cause the one or more processors to: receive signals from one or more detectors arranged to detect one or more environmental features associated with a real world environment in which the user device of an extended reality system is located; retrieve data from a user data store relating to one or more user features associated with interactions between the user and applications supported by the extended reality system; determine, using the signals from the one or more detectors and the data from the user store, at least one application supported by the extended reality system suitable for use by the user device in the real world environment; and facilitate launch of the at least one application on the user device.

Aspect 65: The method of Aspect 64, wherein facilitating launch of an application comprises automatically launching an application on the use device.

Aspect 66: The method of Aspect 64, wherein facilitating launch of an application comprises controlling the display to give an indication of an application to a user of the device.

Aspect 67: An apparatus including: means for receiving signals from one or more detectors arranged to detect one or more environmental features associated with a real world environment in which the user device of an extended reality system is located; means for retrieving data from a user data store relating to one or more user features associated with interactions between the user and applications supported by the extended reality system; means for determining, using the signals from the one or more detectors and the data from the user store, at least one application supported by the extended reality system suitable for use by the user device in the real world environment; and means for facilitating launch of the at least one application on the user device.

Aspect 68: The method of Aspect 67, wherein facilitating launch of an application comprises automatically launching an application on the use device.

Aspect 69: The method of Aspect 67, wherein facilitating launch of an application comprises controlling the display to give an indication of an application to a user of the device.

What is claimed is:

1. An apparatus for providing recommendations for extended reality systems, the apparatus comprising:
a memory; and
a processor configured to:
determine one or more environmental features associated with a real-world environment of the apparatus;
determine one or more user features associated with a user of the apparatus;
determine a match score indicating a level of compatibility between at least one application supported by the apparatus and at least one of the one or more environmental features and the one or more user features;
determine the match score exceeds a threshold match score; and
output, based on the match score exceeding the threshold match score, a notification associated with the at least one application.

2. The apparatus of claim 1, wherein the notification associated with the at least one application includes a recommendation of the at least one application, the recommendation of the at least one application being determined based on the one or more environmental features and the one or more user features.

3. The apparatus of claim 1, wherein the notification associated with the at least one application includes a recommendation of at least one modification associated with the at least one application.

4. The apparatus of claim 3, wherein the processor is further configured to:
detect the user is interacting with the at least one application; and
determine the at least one modification associated with the at least one application based on detecting the user is interacting with the at least one application.

5. The apparatus of claim 3, wherein the at least one modification is associated with the real-world environment.

6. The apparatus of claim 3, wherein the at least one modification is associated with one or more settings of the at least one application.

7. The apparatus of claim 3, wherein the processor is configured to determine the at least one modification based on at least one of environmental features associated with a plurality of users and user features associated with the plurality of users.

8. The apparatus of claim 1, wherein the processor is configured to determine the one or more environmental features based on a scan of the real-world environment.

9. The apparatus of claim 8, wherein the processor is configured to cause the scan of the real-world environment, the scan of the real-world environment being performed by an image sensor of the apparatus.

10. The apparatus of claim 1, wherein the processor is configured to determine the one or more environmental features based on previously stored data indicating the one or more environmental features.

11. The apparatus of claim 1, further comprising an image sensor configured to capture image data associated with the real-world environment, wherein the processor is configured to determine the one or more environmental features based at least in part on the image data.

12. The apparatus of claim 11, wherein the processor is configured to determine a layout of one or more physical objects within the real-world environment based at least in part on the image data.

13. The apparatus of claim 11, wherein the processor is configured to determine activity of one or more people within the real-world environment based at least in part on the image data.

14. The apparatus of claim 11, wherein the processor is configured to determine, based at least in part on the image data, a layout of a plurality of physical objects relative to the apparatus within the real-world environment.

15. The apparatus of claim 1, further comprising an audio sensor configured to capture audio data associated with the real-world environment, wherein the processor is configured to determine the one or more environmental features based at least in part on the audio data.

16. The apparatus of claim 15, wherein the processor is configured to determine activity of one or more people within the real-world environment based at least in part on the audio data.

17. The apparatus of claim 1, wherein the processor is configured to determine the one or more environmental features based at least in part on detecting one or more network-enabled devices within the real-world environment based on network communication with the one or more network-enabled devices.

18. The apparatus of claim 1, further comprising one or more biological sensors configured to obtain user data associated with a physiological state or an emotional state of the user, wherein the processor is configured to determine the one or more user features based at least in part on the user data.

19. The apparatus of claim 1, wherein the processor is configured to determine the one or more user features based on user input indicating at least one of an age of the user, a gender of the user, a geographic location of the user, a height of the user, and a weight of the user.

20. The apparatus of claim 1, wherein the processor is configured to determine the one or more user features based on monitoring application usage patterns of the user to determine application preferences of the user.

21. The apparatus of claim 1, wherein the processor is configured to determine the match score based on:
   determining one or more application features associated with the at least one application; and
   comparing the one or more application features with at least one of the one or more environmental features and the one or more user features.

22. The apparatus of claim 21, wherein the processor is configured to determine the one or more application features based on accessing an application profile associated with the at least one application from a server, wherein the application profile is generated based on application features determined by a plurality of apparatuses.

23. The apparatus of claim 1, wherein the processor is configured to:
   display, on a display of the apparatus, the match score in association with the at least one application, the match score indicating a level of compatibility between the at least one application and at least one of the one or more environmental features and the one or more user features.

24. The apparatus of claim 1, wherein the processor is configured to:
   provide a recommendation of a plurality of applications to the user; and
   display, on a display of the apparatus, a plurality of match scores in association with the plurality of applications, the plurality of match scores indicating levels of compatibility between the plurality of applications and at least one of the one or more environmental features and the one or more user features.

25. The apparatus of claim 24, wherein the processor is configured to determine the plurality of match scores based on at least the one or more environmental features.

26. The apparatus of claim 24, wherein the processor is configured to determine the plurality of match scores based on at least the one or more user features.

27. The apparatus of claim 1, wherein the apparatus is an extended reality system.

28. A method for providing recommendations for extended reality systems, the method comprising:
   determining one or more environmental features associated with a real-world environment of an extended reality system;
   determining one or more user features associated with a user of the extended reality system;
   determining a match score indicating a level of compatibility between at least one application and at least one of the one or more environmental features and the one or more user features;
   determining the match score exceeds a threshold match score; and
   outputting, based on the match score exceeding the threshold match score, a notification associated with the at least one application.

29. The method of claim 28, wherein the notification associated with the at least one application includes a recommendation of the at least one application, the recommendation of the at least one application being determined based on the one or more environmental features and the one or more user features.

30. The method of claim 28, wherein the notification associated with the at least one application includes a recommendation of at least one modification associated with the at least one application.

31. The method of claim 30, further comprising:
   detecting the user is interacting with the at least one application; and
   determining the at least one modification associated with the at least one application based on detecting the user is interacting with the at least one application.

32. The method of claim 30, wherein the at least one modification is associated with the real-world environment.

33. The method of claim 30, wherein the at least one modification is associated with one or more settings of the at least one application.

34. The method of claim 30, further comprising determining the at least one modification based on at least one of environmental features associated with a plurality of users and user features associated with the plurality of users.

35. The method of claim 28, further comprising determining the one or more environmental features based on previously stored data indicating the one or more environmental features.

36. The method of claim 28, further comprising determining the one or more environmental features based at least in part on image data associated with the real-world environment captured by at least one image sensor of the extended reality system.

37. The method of claim 36, further comprising determining a layout of one or more physical objects within the real-world environment based at least in part on the image data.

38. The method of claim 36, further comprising determining activity of one or more people within the real-world environment based at least in part on the image data.

39. The method of claim 28, further comprising determining the one or more environmental features based at least in part on audio data associated with the real-world environment captured by an audio sensor of the extended reality system.

40. The method of claim 39, further comprising determining activity of one or more people within the real-world environment based at least in part on the audio data.

41. A non-transitory computer-readable storage medium having stored thereon instructions that, when executed by one or more processors, cause the one or more processors to:
- determine one or more environmental features associated with a real-world environment of an extended reality system;
- determine one or more user features associated with a user of the extended reality system;
- determine a match score indicating a level of compatibility between at least one application and at least one of the one or more environmental features and the one or more user features;
- determine the match score exceeds a threshold match score; and
- provide a recommendation of the at least one application to the user based on the match score exceeding the threshold match score.

* * * * *